(12) United States Patent
Ohira

(10) Patent No.: US 8,165,402 B2
(45) Date of Patent: Apr. 24, 2012

(54) IMAGE PROCESSING METHOD, IMAGE PROCESSING APPARATUS, IMAGE FORMING APPARATUS AND STORAGE MEDIUM

(75) Inventor: Masakazu Ohira, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 551 days.

(21) Appl. No.: 12/406,463

(22) Filed: Mar. 18, 2009

(65) Prior Publication Data

US 2009/0238464 A1 Sep. 24, 2009

(30) Foreign Application Priority Data

Mar. 21, 2008 (JP) ................................. 2008-074063

(51) Int. Cl.
*G06K 9/46* (2006.01)
*H04N 1/40* (2006.01)

(52) U.S. Cl. ........................................ 382/190; 358/448

(58) Field of Classification Search .................. 382/162, 382/190, 235, 276, 305, 307, 198, 309; 701/28; 704/203; 712/223; 715/236, 249; 358/1.15, 358/2.1, 3.23, 448, 462, 530, 534
See application file for complete search history.

(56) References Cited

U.S. PATENT DOCUMENTS

| | | | | |
|---|---|---|---|---|
| 5,583,949 A | * | 12/1996 | Smith et al. | 382/199 |
| 6,577,760 B1 | * | 6/2003 | Ohta et al. | 382/167 |
| 7,016,552 B2 | * | 3/2006 | Koyama | 382/289 |
| 2008/0177764 A1 | * | 7/2008 | Kise et al. | 707/100 |

FOREIGN PATENT DOCUMENTS

| | | |
|---|---|---|
| JP | 3-135163 A | 6/1991 |
| JP | 2005-130281 A | 5/2005 |
| JP | 2007-074362 A | 3/2007 |
| WO | WO-2006/092957 A1 | 9/2006 |

OTHER PUBLICATIONS

Nakai et al., "Document Image Retrieval and Removal of Perspective Distortion Based on Voting for Cross-Ratios.", Meeting on Image Recognition and Understanding (MIRU2005) Jul. 2005, pp. 538-545.

* cited by examiner

*Primary Examiner* — Abolfazl Tabatabai
(74) *Attorney, Agent, or Firm* — Birch, Stewart, Kolasch & Birch, LLP

(57) ABSTRACT

An image processing apparatus is configured to precisely perform positioning of a plurality of document images containing a common part and to precisely extract an image of the common part from the plurality of document images.

9 Claims, 17 Drawing Sheets

FIG. 3 (a)

STANDARD DOCUMENT

| DATE | ●●●● |
|---|---|
| NAME | ●●●● SIGNATURE |
| ADDRESS | ●●●● ●●●● |
| PHONE NUMBER | ●●●● |

REFERENCE DOCUMENT 1

| DATE | ▲▲▲▲ |
|---|---|
| NAME | ▲▲▲▲▲ SIGNATURE |
| ADDRESS | ▲▲▲ ▲▲▲▲ |
| PHONE NUMBER | ▲▲▲▲ |

REFERENCE DOCUMENT 2

| DATE | ■■■■ |
|---|---|
| NAME | ■■■■ SIGNATURE |
| ADDRESS | ■■■■ ■■■■ |
| PHONE NUMBER | ■■■■ |

COMMON PART

| DATE | |
|---|---|
| NAME | SIGNATURE |
| ADDRESS | |
| PHONE NUMBER | |

FIG. 4

| HASH VALUE | INDEX INDICATIVE OF FEATURE POINT | COORDINATE OF FEATURE POINT |
|---|---|---|
| H1 | f1 | (x11, y11) |
| H2 | f2 | (x12, y12) |
| H3 | f3 | (x13, y13) |
| H4 | f4 | (x14, y14) |
| H5 | f5 | (x15, y15) |
| H6 | f6 | (x16, y16) |
| ⋮ | ⋮ | ⋮ |

FIG. 5

| HASH VALUE | STANDARD DOCUMENT | | REFERENCE DOCUMENT | |
|---|---|---|---|---|
| | INDEX INDICATIVE OF FEATURE POINT | COORDINATE OF FEATURE POINT | INDEX INDICATIVE OF FEATURE POINT | COORDINATE OF FEATURE POINT |
| H1 | f1 | (x11, y11) | p1 | (x21, y21) |
| H2 | f2 | (x12, y12) | p2 | (x22, y22) |
| H3 | f3 | (x13, y13) | | |
| H4 | f4 | (x14, y14) | p3 | (x23, y23) |
| H5 | f5 | (x15, y15) | | |
| H6 | f6 | (x16, y16) | p4 | (x24, y24) |
| ... | ... | ... | ... | ... |

FIG. 7
| -3 | -2 | -1 | 1  | -1 | -2 | -3 |
|----|----|----|----|----|----|----|
| -2 | -2 | 1  | 4  | 1  | -2 | -2 |
| -1 | 1  | 8  | 15 | 8  | 1  | -1 |
| 1  | 5  | 16 | 25 | 16 | 5  | 1  |
| -1 | 1  | 8  | 15 | 8  | 1  | -1 |
| -2 | -2 | 1  | 4  | 1  | -2 | -2 |
| -3 | -2 | -1 | 1  | -1 | -2 | -3 |
FIG. 8
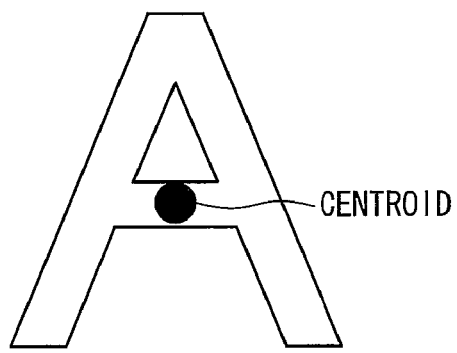
FIG. 9
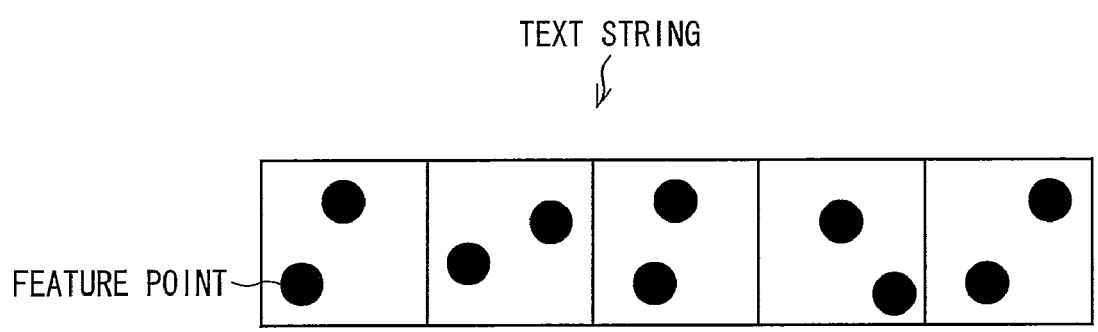

|   | COORDINATE OF FEATURE POINT OF STANDARD DOCUMENT | COORDINATE OF FEATURE POINT OF REFERENCE DOCUMENT |
|---|---|---|
| 1 | (x1, y1) | (x1', y1') |
| 2 | (x2, y2) | (x2', y2') |
| 3 | (x3, y3) | (x3', y3') |
| 4 | (x4, y4) | (x4', y4') |

IMAGE PROCESSING METHOD, IMAGE PROCESSING APPARATUS, IMAGE FORMING APPARATUS AND STORAGE MEDIUM

This Nonprovisional application claims priority under 35 U.S.C. §119(a) on Patent Application No. 2008-074063 filed in Japan on Mar. 21, 2008, the entire contents of which are hereby incorporated by reference.

TECHNICAL FIELD

The present invention relates to (i) an image processing method, (ii) an image processing apparatus, (iii) an image forming apparatus, each of which is for processing a plurality of image data including (a) image data based on a common format image and (b) image data based on an image such as a handwritten image, and (iv) a storage medium.

BACKGROUND ART

In recent years, computerization of information has been promoted. According to the computerization, paper documents are scanned by a scanner or the like so as to be changed into image data, and the image data is stored in a storage medium. Meanwhile, it is known that there is a document matching technique for judging whether or not scanned image data matches the image data stored in the storage medium. The document matching technique is utilized in image data processing in various ways.

For example, if image data obtained by the computerization is stored without modification, an amount of data becomes enormous, and therefore a large storage capacity is required. In view of the circumstances, for example, a Patent Literature 1 proposes a technique, which utilizes the document matching technique, for reducing an amount of a plurality of image data, to be stored, having a common format such as a ruled line.

Specifically, in the technique disclosed in the Patent Literature 1, (i) a common part (common format) shared by full page of the documents and (ii) independent parts inherent in each of the documents are extracted from image data (image information) inputted by scanning a plurality of documents, and then the common part and the independent parts are divided and stored. In this case, only one data is stored with regard to the common part of the image data, and separate data is stored with regard to each of the independent parts. This makes it possible to reduce an amount of image data to be stored, regardless of a format.

Specifically, image data of full page is extracted from binarized image data, and a logic operation AND is carried out with respect to the image data of full page so that a common part shared by the full page is extracted. Further, image data of each page is extracted from the binarized image data, and a logic operation EXCLUSIVE OR is carried out with respect to the image data thus extracted and the common part so that independent parts inherent in each page is extracted. The common part and the independent parts thus obtained are encoded and stored.

Citation List
Patent Literature 1
Japanese Patent Application Publication, Tokukaihei, No. 1991-135163 A (Publication Date: Jun. 10, 1991)
Patent Literature 2
WO 2006/092957 (Publication Date: Sep. 8, 2006)
Non Patent Literature 1
"Document image Retrieval and Removal of Perspective Distortion Based on Voting for Cross-Ratios" Tomohiro NAKAI, Koichi KISE, and Masakazu IWAMURA, Meeting on Image Recognition and Understanding (MIRU2005) (Information Processing Society of Japan, Computer Vision and Image Media) pp. 538-pp 545

Note that it is necessary to carry out precise positioning of a plurality of image data, in a case like the Patent Literature 1 where a common part and independent parts are found with the use of a logic operation AND and logic operation EXCLUSIVE OR, respectively, from a plurality of image data (written image information) inputted by scanning a plurality of documents. However, the Patent Literature 1 does not disclose an arrangement in which such precise positioning can be realized. Therefore, according to the technique disclosed in the Patent Document 1, it appears difficult to extract the common part and the independent parts, from a practical standpoint. This poses a serious problem especially when one wishes to extract a document image of a common part from a plurality of document images which have the common part and have different written texts.

SUMMARY OF INVENTION

An object of the present invention is to provide (i) an image processing method, (ii) an image processing apparatus, (iii) an image forming apparatus, in each of which a precise positioning can be carried out with respect to a plurality of document images which have a common part (common format) so that an image of the common part (common format) can be precisely extracted, and (iv) a storage medium.

In order to achieve the above problems, an image processing apparatus of the present invention includes: a feature point extracting section for extracting, from first and second document image data among plural inputted document image data, first feature points of the first document image data and second feature points of the second document image data, a features calculating section for calculating first features of the first feature points and second features of the second feature points, a matching process section for comparing the first features with the second features, and for extracting a plurality of first feature points and a plurality of second feature points whose features agree with each other, a coordinate transformation section for transforming a coordinate system of the second document image data into a coordinate system of the first document image data in accordance with coordinates of the first and second feature points extracted by the matching process section, and a logical AND operation section for performing a logical AND operation of the first document image data and the second document image data which has been processed by the coordinate transformation section so as to extract image data, having a common format, contained in the first and second document image data.

Further, an image processing method of the present invention includes the steps of: (a) extracting, from first and second document image data among plural inputted document image data, first feature points of the first document image data and second feature points of the second document image data, (b) calculating first features of the first feature points and second features of the second feature points, (C) comparing the first features with the second features, and for extracting a plurality of first feature points and a plurality of second feature points whose features agree with each other, (d) transforming a coordinate system of the second document image data into a coordinate system of the first document image data in accordance with coordinates of the first and second feature points extracted in the step (C), and (e) performing a logical AND operation of the first document image data and the second document image data which has been processed in the step (d) so as to extract image data, having a common format, contained in the first and second document image data. According to the above arrangement, from first and second document image data among plural inputted document image data, first feature points of the first document image data and second feature points of the second document image data are extracted. Next, first features of the first feature points and second features of the second feature points are calculated. Next, the first features and the second features are compared so that a first feature point and a second feature point whose features agree with each other are extracted. Next, a coordinate system of the second document image data is transformed into a coordinate system of the first document image data in accordance with coordinates of the first feature point thus extracted. Subsequently, a logical AND operation of the first document image data and the second document image data which has been subjected to the coordinate transformation is performed so that image data, having a common format, contained in the first and second document image data is extracted.

As described above, in the arrangement of the present invention, first document image data and second document image data are selected from a plurality of inputted document image data; a feature point of the first document image data and a feature point of the second document image data whose features agree with each other are extracted; and a positioning of the first document image data and the second document image data is performed with the use of the feature points thus extracted. As a result, it is unnecessary to prepare, in advance, document image data which has no written text and only has a common format. Further, it is possible to precisely extract image data, having a common format, contained in the first document image data and the second document image data.

Note that document image data inputted in the image processing apparatus is, for example, image data obtained by scanning a document with a scanner, or electronic data obtained by filling out a form (electronic data) with the use of a computer (software). That is, the document image data inputted in the image processing apparatus is image data obtained by computerizing an image which is printed or written on paper, or image data which is created as electronic data (electronic application form).

BRIEF DESCRIPTION OF DRAWINGS

FIG. 1 is a block diagram showing an arrangement of an information processing apparatus of an embodiment of the present invention.

FIG. 2 is a block diagram showing an arrangement of a digital color copying machine including the image processing apparatus shown in FIG. 1.

FIG. 3

FIG. 3(a) is an explanatory view showing a standard document which is processed in the image processing apparatus shown in FIG. 1, FIG. 3(b) is an explanatory view showing a first reference document, FIG. 3(c) is an explanatory view showing a second reference document, and FIG. 3(d) is an explanatory view showing an image of a common format that is extracted from the standard document and the reference documents.

FIG. 4

FIG. 4 is an explanatory view showing a table in which features (feature vectors, hash value), indices indicative of feature points and coordinates of the feature points are stored with regard to a standard image.

FIG. 5

FIG. 5 is a table showing a relationship of feature points at which the features of the standard image agree with those of a reference image.

FIG. 6 is a block diagram showing an arrangement of a feature point calculating section shown in FIG. 1.

FIG. 7

FIG. 7 is an explanatory view showing a filter coefficient of a filter with a sharpening and a smoothing characteristics provided in an MTF correction process section shown in FIG. 6.

FIG. 8

FIG. 8 is an explanatory view showing an example of a connecting area extracted from binarized input image data and a centric of the connecting area.

FIG. 9

FIG. 9 is an explanatory view showing an example of cancroids (feature points) of plural connecting areas extracted from a text string included in binarized image data.

FIG. 10 is a block diagram showing an arrangement of a features calculating section shown in FIG. 1.

FIG. 11 is an explanatory view showing how a feature point extracting section shown in FIG. 10 extracts peripheral feature points around a target feature point.

FIGS. 12(a) through 12(d) are views each showing an example of a combination of three feature points which can be selected from four peripheral feature points extracted by the feature point extracting section. FIG. 12(a) is an explanatory view showing a combination of peripheral feature points b, C, and d around a target feature point a, FIG. 12(b) is an explanatory view showing a combination of peripheral feature points b, C, and e around the target feature point a, FIG. 12(c) is an explanatory view showing a combination of peripheral feature points b, d, and e around the target feature point a, and FIG. 12(d) is an explanatory view showing a combination of peripheral feature points C, d, and e around the target feature point a.

FIGS. 13(a) through 13(d) are views each showing an example of a combination of three peripheral feature points which can be selected in a case where one of four peripheral feature points extracted by the feature point extracting section is set as a target feature point. FIG. 13(a) is an explanatory view showing a combination of peripheral feature points a, e, and F around a target feature point b, FIG. 13(b) is an explanatory view showing a combination of peripheral feature points a, e, and C around the target feature point b, FIG. 13(c) is an explanatory view showing a combination of peripheral feature points a, F, and C around the target feature point b, and FIG. 13(d) is an explanatory view showing a combination of peripheral feature points e, F, and C around the target feature point b.

FIG. 14 is an explanatory view showing how a coordinate transformation section shown in FIG. 1 carries out a positioning of a standard image and a reference image based on their feature points whose features (feature vectors, hash values) agree with each other.

FIG. 15 is an explanatory view showing a relationship between (i) coordinates of the feature points of the standard image and (ii) coordinates of the feature points of the reference image, each of the coordinates being obtained as a result of the positioning of the standard image and the reference image (see FIG. 14).

FIG. 16 is a flowchart showing how the image processing apparatus shown in FIG. 1 operates.

FIG. 17 is a flowchart showing another example as to how the image processing apparatus shown in FIG. 16 operates.

FIG. 18 is a block diagram showing an arrangement of an image processing apparatus of another embodiment of the present invention.

FIG. 19 is a flowchart showing how the image processing apparatus shown in FIG. 18 operates.

FIG. 20 is a block diagram showing an arrangement of a digital color copying machine including the image processing apparatus of the embodiment of the present invention.

FIG. 21 is a block diagram showing an arrangement of a color image scanning apparatus including the image processing apparatus of the embodiment of the present invention.

DESCRIPTION OF EMBODIMENTS

An embodiment of the present invention is described below with reference to the attached drawings.

Figure 1:
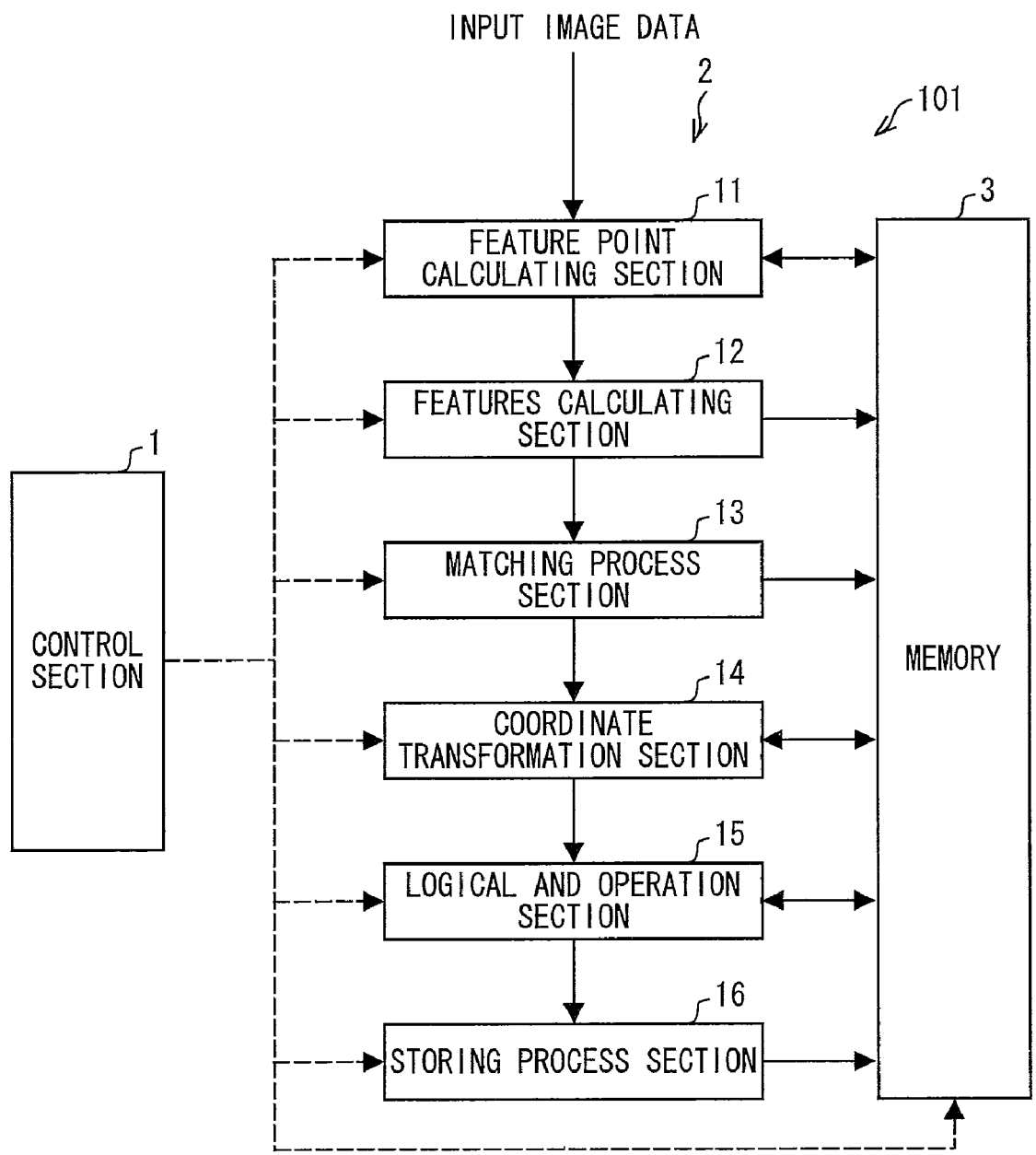
FIG. 1

FIG. 1 is a block diagram showing an arrangement of an image processing apparatus 101 of the present embodiment. The image processing apparatus 101 is provided, for example, in a digital color copying machine (image processing apparatus, image forming apparatus) 102 shown in FIG. 2.

The image processing apparatus 101 carries out processing with respect to image data obtained when documents shown in, for example, FIGS. 3(a) through 3(c) are scanned by a scanner. FIG. 3(a) is a view showing a standard document, FIG. 3(b) is a view showing a first reference document, and FIG. 3(c) is a view showing a second reference document. Each of the standard document and the first and second reference documents has (i) a common part (common format) such as a ruled line and/or a predetermined text string and (ii) an independent part inherent in each of the documents (e.g. handwritten texts).

The image processing apparatus 101 compares (i) image data of the standard document (standard image data) with (ii) respective of image data of the first and second reference documents (reference image data) so as to extract image data of the common part (common format) of the documents. FIG. 3(d) is a view showing an image of the common format which image is obtained when the image data of the common part (common format) is printed.

From among a plurality of image data of a plurality of documents which are sequentially supplied, the image processing apparatus 101 recognizes (i) image data which is inputted first as standard image data (hereinafter simply referred to as a standard image) and (ii) image data which is inputted after the standard image as reference image data (hereinafter simply referred to as a reference image).

As shown in FIG. 1, the image processing apparatus 101 includes a control section 1, a document matching process section 2 and a memory (storage means) 3. The document matching process section 2 includes a feature point calculating section 11, a features calculating section 12, a matching process section 13, a coordinate transformation section 14, a logical AND operation section 15 and a storing process section 16.

The feature point calculating section 11 extracts, as a feature point, a connecting part of a text string or a ruled line, and calculates a centric of the connecting part.

The features calculating section 12 calculates an invariant which is invariable regardless of rotation, scaling up, and scaling down, with the use of a feature point calculated by the feature point calculating section 11. Note that the invariant intends to features which are parameters invariable regardless of geometric transformation such as rotation, parallel shift, scaling up, and/or scaling down of a document image. The features calculating section 12 selects and uses feature points in the vicinity of a target feature point during calculating the features.

The matching process section 13 carries out a matching process with respect to a standard image and respective of reference images. In the matching process, binary image data of the standard image and the reference images is used. Then, the matching process section 13 compares features (feature vectors, hash values) which the features calculating section 12 has calculated with respect to the feature points of the standard image (binary image data) and the reference images (binary image data), which feature points are calculated by the feature point calculating section 11. Next, features (feature vectors, hash value), indices indicative of feature points, and coordinates of feature points are stored, with regard to the feature points at which the features (feature vectors, hash value) of the standard image agree with those of respective of the reference images. Note that a linearization process section 24 (see FIG. 6) of the feature point calculating section 11 carries out the linearization of the image data of the standard document and the image data of the reference documents.

Specifically, in the matching processing, the matching process section 13 uses a table in which features (feature vectors, hash value), indices indicative of the feature points and coordinates of the feature points are stored with regard to a standard image (see FIG. 4). The table is stored in the memory 3. The storing process section 16 carries out the storing process. The matching process section 13 judges existence or nonexistence of an agreement between features (feature vectors, hash values) of the feature points of the standard image and respective of features of the feature points of reference images, and then obtains coordinates of the feature points at which the features of the standard image agree with those of the reference image. As a result of this process, (i) indices indicative of the feature points at which the features of the standard image agree with those of the reference image and (ii) coordinates of the feature points are stored in the table shown in FIG. 4. Thus, it is possible to obtain a table showing a relationship between feature points at which the features of the standard image agree with those of the reference image (see FIG. 5). The storing process section 16 carries out a storing process.

For example, in the example shown in FIG. 5, features (feature vectors, hash values) of a feature point p1 of the reference image agree with those of a feature point f1 of the standard image; features (feature vectors, hash values) of a feature point p2 of the reference image agree with those of a feature point f2 of the standard image; and features (feature vectors, hash values) of a feature point p3 of the reference image agree with those of a feature point f4 of the standard image.

The coordinate transformation section 14 carries out positioning between a standard image (binary image data) and a reference image (binary image data), with the use of coordinates of first feature points of the standard image and coordinates of second feature points of the reference image. Note that the matching process section 13 determines that the features (feature vectors, hash values) at the first feature points agree with those at the second feature points, respectively. The Non Patent Literature 1 contains a description related to this.

Further, there is a case where it is determined that first features at a feature point of a standard image agree with second features at a feature point of a reference image although there is no agreement between the first and second features. In view of the circumstances, a coordinate transformation is carried out with the use of a method such as robust estimation so as not to be affected by pairs (outlier) of feature points at which the first and second features do not agree with each other.

The logical AND operation section 15 performs a logical AND operation with the use of the standard image (binary image data) and the reference image (binary image data) which were subjected to the positioning process carried out by the coordinate transformation section 14.

The storing process section 16 associates (i) features (feature vectors, hash values) at feature points with (ii) indices indicative of the feature points and (iii) coordinates of the feature points, each calculated based on a standard image, and then stores associated results in the memory 3. This storing state is shown in FIG. 4. Further, image data (image data on a high density side) obtained when a logical AND operation of a standard image and a reference image is performed by the logical AND operation section 15 is stored in the memory 3. Note that in a case where a storing process is carried out with respect to a standard image, each of the matching process section 13, the coordinate transformation section 14 and the logical AND operation section 15 does not carry out any processing.

The control section (CPU) 1 controls access to the sections of the document matching process section 2 and to the memory 3.

Figure 6:
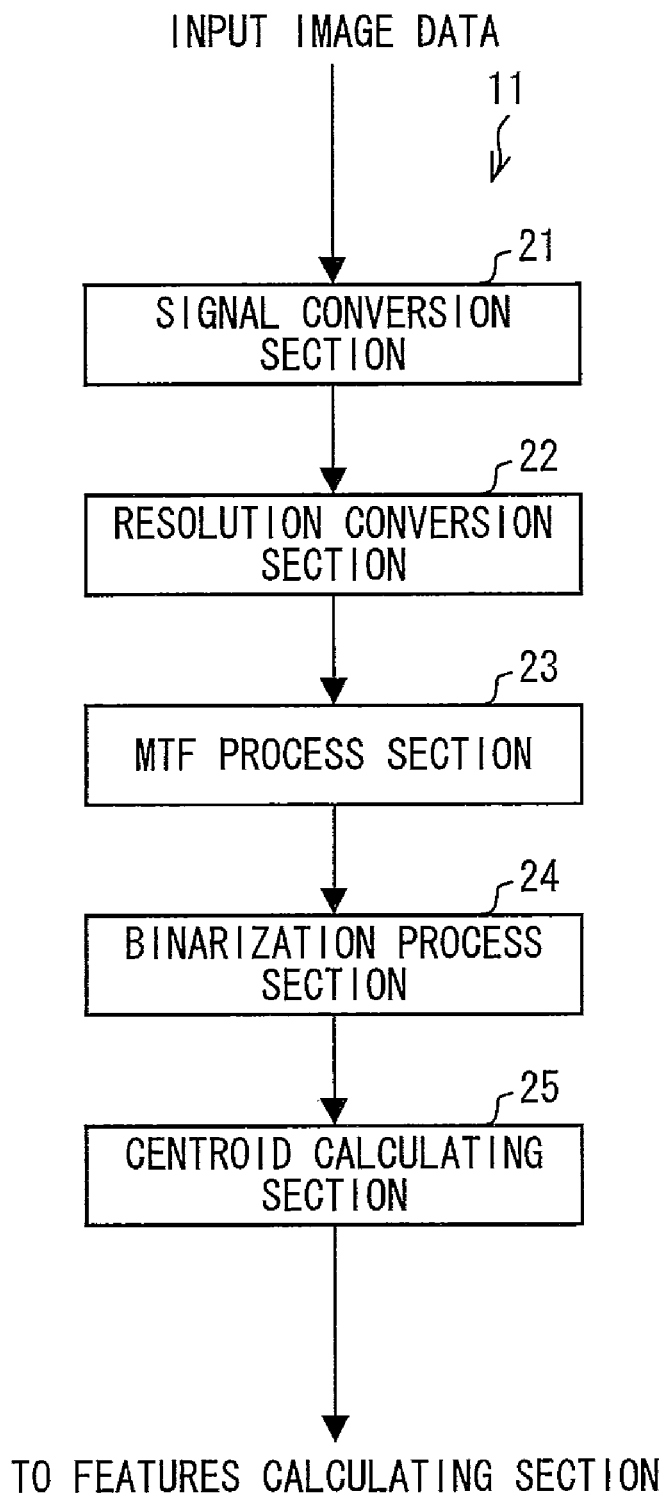
FIG. 6

FIG. 6 is a block diagram showing an arrangement of the feature point calculating section 11. As shown in FIG. 6, the feature point calculating section 11 includes a signal conversion section 21, a resolution conversion section 22, an MTF process section 23, the linearization process section 24, and a centroid calculating section 25.

In a case where inputted image data such as standard image data and reference image data is related to a color image, the signal conversion section 21 achromatizes and converts the inputted image data into a brightness signal or a luminance signal.

For example, luminance Y can be found based on the following expression.

$$Y_j = 0.30 R_j + 0.59 G_j + 0.11 B_j \quad \text{Math 1}$$

"Y" refers to a luminance signal of each pixel, and each of R, G, and B is a color component of each pixel.

Achromatic process is not limited to the one expressed by the expression. Alternatively, RGB signals can be converted into CIE1976L*a*b* signal (CIE: Commission International de l'Eclairage, L*: brightness, a*, b*: chromaticity).

The resolution conversion section 22 enlarges or reduces again the inputted image data, in a case where the inputted image data has been optically enlarged or reduced by an image input apparatus. The image input apparatus is, for example, a scanner which scans and converts an image on a document into image data. The image input apparatus corresponds to the color image input apparatus 111 of the digital color copying machine shown in FIG. 2.

Further, the resolution conversion section 22 is also used as a resolution conversion section which has a smaller resolution than the resolution at which the image input apparatus scans the inputted image data without enlarging and reducing. This allows a reduction in processing amount carried out by the subsequent processing sections. For example, image data scanned at 600 dpi (dot per inch) is converted so as to have a resolution of 300 dpi).

The MTF process section 23 is used so as not to be affected by the fact that the spatial frequency characteristics vary depending on types of image input devices. In the image signal outputted by the CCD, an MTF deterioration occurs due to optical components such as lenses and mirrors, an aperture of a light receiving surface of the CCD, transfer efficiency, afterimage, integrating effect and scanning unevenness caused by physical scanning, and a similar cause. The MFT deterioration causes the scanned image to blur. The MTF correction process section 23 carries out an appropriate filtering process (emphasizing process) with respect to the image signal so as to recover the blur caused by the MTF deterioration. Further, the MTF process section 23 is also used to suppress high frequency components which are unnecessary in a process made by a feature point extracting section 31 of the features calculating section 12 by which the feature point calculating section 11 is followed. That is, a filter with a sharpening and a smoothing characteristics is used to carry out an emphasizing process and a smoothing process. Note that, FIG. 7 illustrates an example of filter coefficients of the above mentioned filter.

The binarization process section 24 compares a luminance value (luminance signal) or brightness value (brightness signal) of the image data that has been achromatized by the signal conversion section 21 with a threshold value. This causes the image data to be binarized. Then, the binarization process section 24 causes the image data thus binarized (binary image data of a standard image and a reference image) to be stored in the memory 3.

The centroid calculating section 25 carries out labeling (labeling process) with respect to each pixel having image data binarized by the binarization process section 24 (for example, the binarized data is represented by "1" or "0"). In the labeling, the same label is given to pixels which have the same value out of two values. Next, the centroid calculating section 25 specifies a connecting area which is an area made up of a plurality of connected pixels each having the same label. Then, the centroid calculating section 25 extracts, as a feature point, a centroid of the connecting area thus specified, and outputs the centroid thus extracted to the features calculating section 12. Note that, the feature point can be expressed by coordinate values (x coordinate, y coordinate) of a binary image.

FIG. 8 is an explanatory drawing illustrating an example of a connecting area extracted from binarized input image data and a centroid of the connecting area. FIG. 8 illustrates the connecting area corresponding to an alphabet "A" and the centroid (feature point) of the alphabet "A". Further, FIG. 9 is an explanatory drawing illustrating an example of centroids (feature points) of plural connecting areas extracted from a text string included in the binarized image data.

Figure 10:
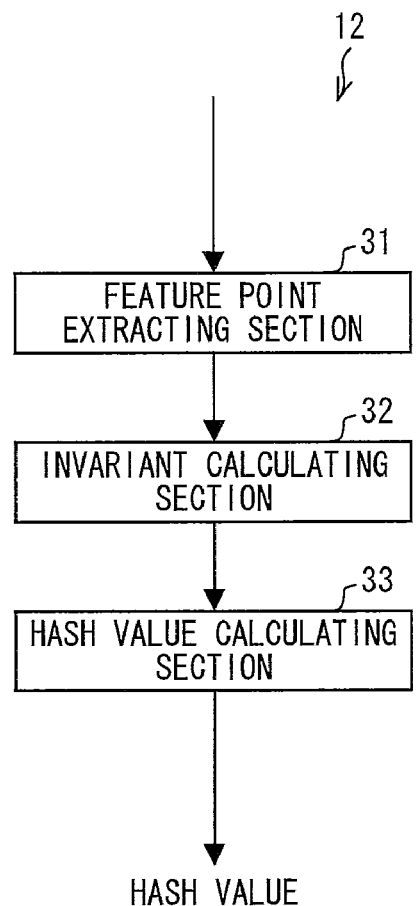
FIG. 10

FIG. 10 is a block diagram showing an arrangement of the features calculating section 12. As shown in FIG. 10, the features calculating section 12 includes the feature point extracting section 31, an invariant calculating section 32, and a hash value calculating section 33.

Figure 11:
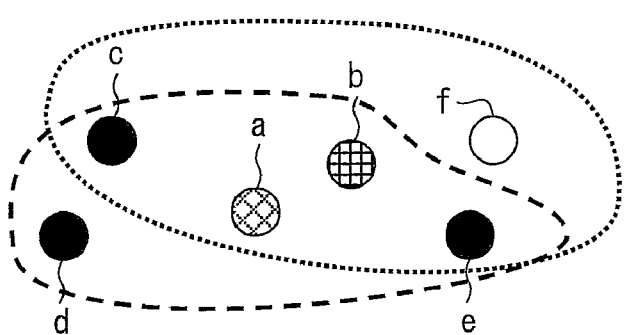
FIG. 11
Figure 12:
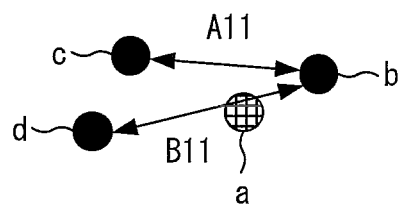
FIG. 12
Figure 12:
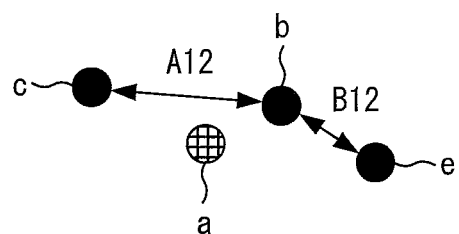
Figure 12:
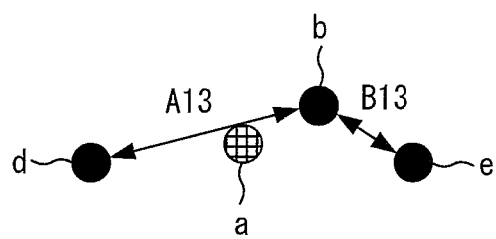
Figure 12:
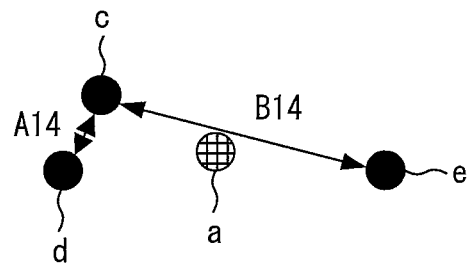
Figure 13:
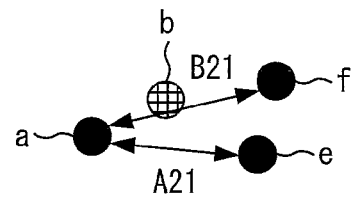
FIG. 13
Figure 13:
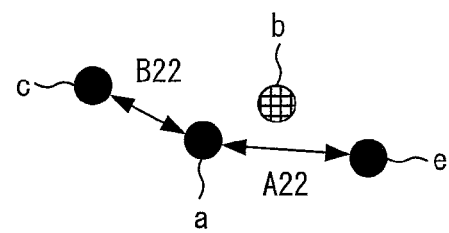
Figure 13:
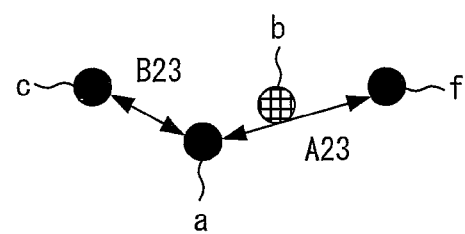
Figure 13:
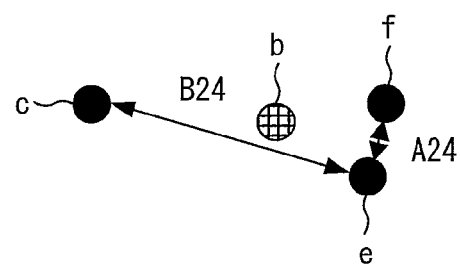

In a case where there exist in image data a plurality of feature points which are calculated by the feature point calculating section 11, the feature point extracting section 31 regards only a single feature point as a target feature point and sequentially extracts a predetermined number of feature points (peripheral feature points) around the target feature point in the order in which a distance from the target feature point is close. In FIG. 11, four feature points b, c, d, and e are extracted as peripheral feature points in case where a feature point a is regarded as a target feature point. In FIG. 11, four feature points a, c, e, and f are extracted as peripheral feature points in case where a feature point b is regarded as a target feature point.

Further, the feature point extracting section 31 extracts a combination of three points which can be selected from the four peripheral feature points thus extracted. For example, as illustrated in FIGS. 12(a) through 12(d), in case where a feature point a shown in FIG. 11 is regarded as a target feature point, combinations of three feature points out of the peripheral feature points b, c, d, and e, that is, a combination of peripheral feature points b, c, and d, a combination of peripheral feature points b, c, and e, a combination of peripheral feature points b, d, and e, and a combination of peripheral feature points c, d, and e are extracted.

The invariant calculating section 32 calculates an invariant (one of features) Hij of the combinations extracted by the feature point extracting section 31, the invariant Hij being invariable regardless of geometrical transformation.

In the invariant Hij, "i" of represents the number of target feature points (i is an integer not less than 1), and "j" represents the number of combinations of three peripheral feature points (j is an integer not less than 1). Note in the present embodiment that the invariant Hij indicates a ratio of lengths of two line segments defined by connecting the peripheral feature points.

Note that the lengths of the line segments are found based on coordinates of the peripheral feature points. For example, in FIG. 12(a), the invariant H11 satisfies H11=A11/B11, when a length of a line segment connecting the feature point b and the feature point c is A11 and a length of a line segment connecting the feature point b and the feature point d is B11. Further, in FIG. 12(b), when a length of a line segment defined by connecting the feature point b and the feature point c is A12 and a length of a line segment defined by connecting the feature point b and the feature point e is B12, the invariant H12 is such that H12=A12/B12. Further, in FIG. 12(c), when a length of a line segment defined by connecting the feature point b and the feature point d is A13 and a length of a line segment defined by connecting the feature point b and the feature point e is B13, the invariant H13 is such that H13=A13/B13. Further, in FIG. 12(d), when a length of a line segment defined by connecting the feature point c and the feature point d is A14 and a length of a line segment defined by connecting the feature point c and the feature point e is B14, the invariant H14 is such that H14=A14/B14. In this manner, the invariants H11, H12, H13, and H14 are calculated in the examples illustrated in FIGS. 12(a) through 12(d).

Note that, in the above examples, Aij refers to a line segment connecting a peripheral feature point which is the nearest to the target feature point and a peripheral feature point which is the second nearest to the target feature point and Bij refers to a line segment connecting a peripheral feature point which is the nearest to the target feature point and a peripheral feature point which is the third nearest to the target feature point. The present embodiment, however, is not limited to this. The line segments used to calculates the invariant Hij can be selected in any manner.

Next, the hash value calculating section 33 calculates a remainder of $Hi=(Hi1\times10^3+Hi2\times10^2+Hi3\times10^1+Hi4\times10^0)/D$ as a hash value (one of features) Hi, and stores the Hi thus calculated in the memory 8. Note that D is a constant number which is set beforehand according to a range within which a remainder value can fall.

Note that how to calculate the invariant Hij is not limited to a particular way. For example, the invariant Hij of a target feature point can be a value calculated in accordance with a compound ratio of five points in the vicinity of a target feature point, or a value calculated in accordance with a compound ratio of five points extracted from n points in the vicinity of a target feature point (n is an integer satisfying $n \geq 5$), or a value calculated in accordance with an arrangement of m points extracted from n points in the vicinity of a target feature point (m is an integer satisfying $m<n$ and $m \geq 5$) and a compound ratio of five points extracted from the m points can be set as. Note that the compound ratio intends to a value calculated based on four points in a straight line or based on five points on a plane, and is known as an invariant which is invariable regardless of projective transformation which is a kind of geometric transformation.

Further, an expression for calculating the hash value Hi is not limited to the above expression, and another hash function (for example, any one of hash functions mentioned in Patent Literature 2) can be used.

After the extraction of peripheral feature points around a target feature point and the calculating of the hash value Hi are completed, the sections of the features calculating section 12 newly select a feature point as a target feature point, and then carries out an extraction of peripheral feature points and a calculating of a hash value. In this manner, the sections of the features calculating section 12 calculate hash values corresponding to all the feature points.

Specifically, according to the example shown In FIG. 11, after the extraction of peripheral feature points around the feature point a and the calculating of a hash value are completed in a case where the feature point a is selected as a target feature point, an extraction of peripheral feature points around the feature point b and a calculating of a hash value are carried out under the condition that the feature point b is selected as a new target feature point. In FIG. 11, four feature points a, c, e, and f are extracted as peripheral feature points, in a case where the feature point b is selected as a target feature point.

Further, as illustrated in FIGS. 13(a) through 13(d), a combination of three points (peripheral feature points a, e, and f, peripheral feature points a, e, and c, peripheral feature points a, f, and c, or peripheral feature points e, f, and c) selected from the peripheral feature points a, c, e, and f is extracted and a hash value corresponding to the combination thus selected is calculated, and the hash value thus calculated is stored in the memory 3. The extraction and calculating are repeated so that hash values are calculated under the conditions that the respective feature points are selected as target feature points, respectively. Then, the hash values thus calculated are stored in the memory 3.

The following description deals with a coordinate transformation operation of the coordinate transformation section 14.

In a case where a common part is extracted from a standard image and a reference image which have a common format, it is necessary to obtain information of positional relationship between the standard image and the reference image with the use of a first feature point of the standard image and a second feature point of the reference image, the features (feature vectors, hash values) of the first and second feature points being judged, by the matching process section 13, to be agreed with each other. In view of this, the coordinate transformation section 14 transforms a coordinate system of the reference image into a coordinate system of the standard image so as to carry out positioning of the standard image and the reference image. Note that the common format can include not only a ruled line and a table but also a common text string.

Figures 14, 15:
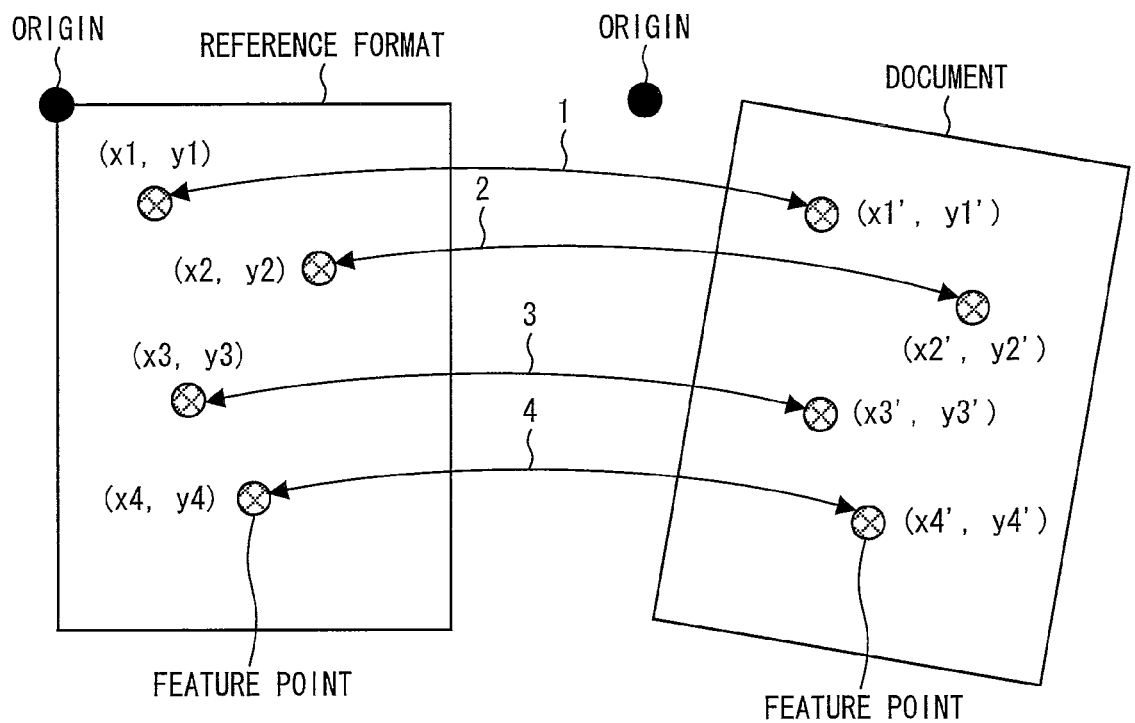
FIG. 14
FIG. 15

FIG. 14 is an explanatory view explaining how a standard image and a reference image are positioned based on their feature points whose features (feature vectors, hash values) agree with each other. FIG. 15 is an explanatory view showing a relationship between coordinates of feature points of the standard image and coordinates of feature points of the reference image which coordinates are obtained as a result of the positioning of the standard image and the reference image. FIGS. 14 and 15 show a case where there are four feature points at which the features (feature vectors, hash values) of the standard image are agreed with those of the reference image, respectively.

Next, in the coordinate transformation section 14, it is assumed that Pout refers to a matrix of coordinates of feature points of the standard image, Pin refers to a matrix of coordinates of feature points of the reference image, and A refers to a transformation coefficient.

$$Pout = \begin{pmatrix} x1 & y1 & 1 \\ x2 & y2 & 1 \\ x3 & y3 & 1 \\ x4 & y4 & 1 \end{pmatrix}, \quad Pin = \begin{pmatrix} x1' & y1' & 1 \\ x2' & y2' & 1 \\ x3' & y3' & 1 \\ x4' & y4' & 1 \end{pmatrix}, \quad \text{Math. 2}$$

$$A = \begin{pmatrix} a & b & c \\ d & e & f \\ g & h & i \end{pmatrix}$$

The transformation coefficient is calculated in accordance with the following expression.

$$Pout = Pin \times A \quad \text{Math. 3}$$

Here, Pin is not a square matrix. Therefore, as shown in the following expressions, both sides of the expression are multiplied by $Pin^T$ which is a transposed matrix, and is further multiplied by an inverse matrix of $Pin^T Pin$.

$$Pin^T Pout = Pin^T Pin \times A$$

$$(Pin^T Pin)^{-1} Pin^T Pout = A \quad \text{Math. 4}$$

Next, the transformation coefficient A thus obtained is used to find a coordinate position of the reference image on the standard image. In this case, a coordinate (x', y') on the reference image is transformed into a coordinate (X, Y) on the standard image with the use of the transformation coefficient A as follows:

$$(x, y, 1) = (x', y', 1) \times A \quad \text{Math. 5}$$

The following description deals with how the coordinate transformation section 14 carries out a coordinate transformation in a case where an influence caused by an outlier is excluded. The outlier is a feature point which was mistakenly extracted as a feature point at which features (feature vectors, hash values) of the standard image agree with those of the reference image.

In a case where there is an outlier in the coordinate transformation, an obtained coordinate transformation coefficient largely deviates from a proper coordinate transformation coefficient. In view of this, a coordinate transformation coefficient can be calculated with the use of an estimation method such as robust estimation which is used in a case where there is an outlier. The following description deals with an example in which a coordinate transformation coefficient is calculated with the use of an LmedS method in the robust estimation.

First, three pairs of feature points are randomly extracted from pairs of feature points which have been extracted, by the matching process section 13, because the features (feature vectors, hash values) of the standard image agree with those of the reference image. In this case, it is assumed that Pout2 refers to a matrix of coordinates of feature points of the standard image, Pin2 refers to a matrix of coordinates of feature points of the reference image, and A2 refers to the transformation coefficient.

$$Pout2 = \begin{pmatrix} x1 & y1 & 1 \\ x2 & y2 & 1 \\ x3 & y3 & 1 \end{pmatrix}, \quad Pin2 = \begin{pmatrix} x1' & y1' & 1 \\ x2' & y2' & 1 \\ x3' & y3' & 1 \end{pmatrix}, \quad \text{Math. 6}$$

$$A2 = \begin{pmatrix} a & b & c \\ d & e & f \\ g & h & i \end{pmatrix}$$

It is further assumed that a relationship between the transformation coefficient A2 and feature points (Pout2, Pin2) is expressed as follows.

$$Pout2 = Pin2 \times A2 \quad \text{Math. 7}$$

Therefore, the transformation coefficient can be obtained with the use of the following expression.

$$A2 = Pin2^{-1} Pout2 \quad \text{Math. 8}$$

Next, each of all the pairs of feature points which are extracted by the matching process section 13, because the features (feature vectors, hash values) of the standard image agree with those of the reference image, is subjected to a coordinate transformation with the use of transformation coefficient A2 thus obtained. Further, differences between obtained coordinate values and actual coordinate values are found. Next, the differences thus found are sorted in order of largeness, and the middle value of the differences thus sorted is set to be an evaluated value of the obtained transformation coefficient A2. Note that the "obtained coordinate values" are values (coordinate values) obtained by transforming coordinates of the feature points of the reference image, respectively, for example in a case where a coordinate system of the reference image is transformed into a coordinate system of the standard image. Further, the "actual coordinate values" are coordinate values of the standard image which correspond to these coordinate values, respectively.

As described above, pairs of feature points at which features (feature vectors, hash values) of the standard image agree with those of the reference image are randomly extracted, a transformation coefficient is found, and an estimated value of the transformation coefficient is determined. This process is repeated a plurality of times. A transformation coefficient whose estimated value is the smallest is a transformation coefficient to be obtained.

Figure 2:
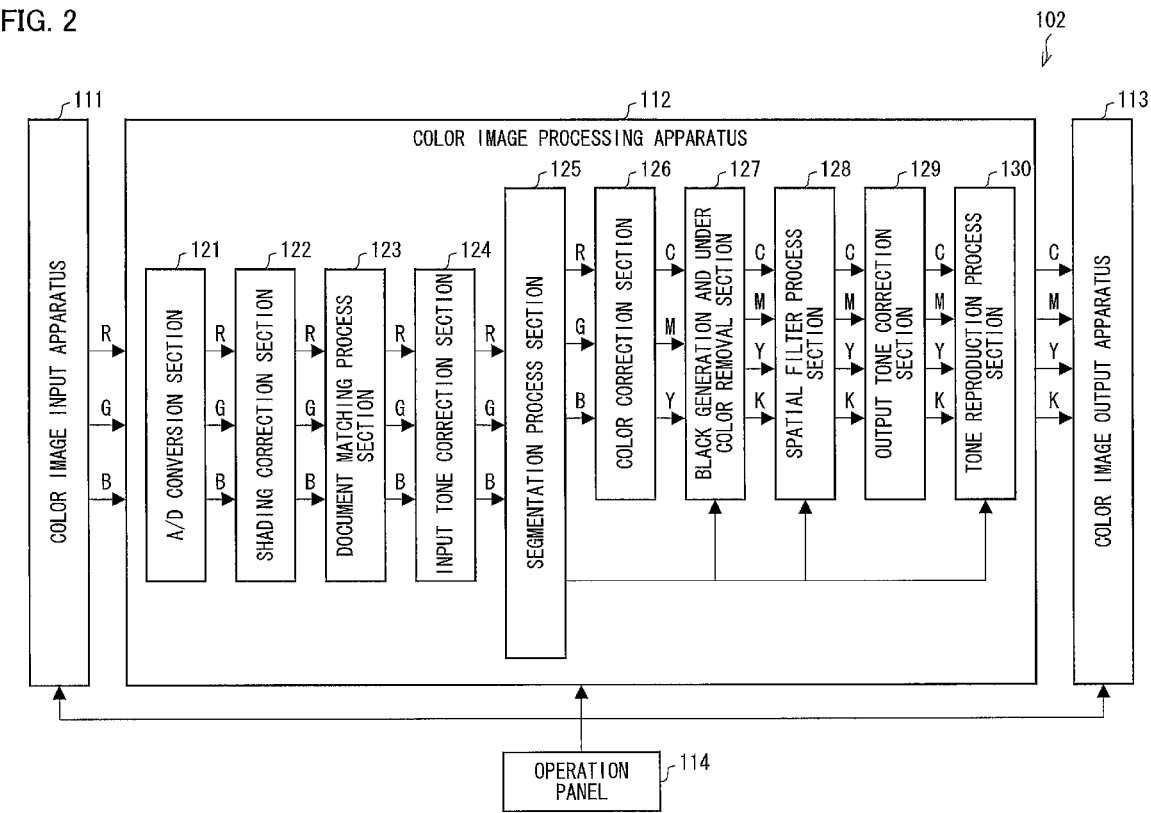
FIG. 2

The following description deals with an arrangement of the digital color copying machine 102 including the image processing apparatus 101. FIG. 2 is a block diagram showing an arrangement of the digital color copying machine 102.

As shown in FIG. 2, the digital color copying machine 102 includes a color image input apparatus 111, a color image processing apparatus 112, and a color image output apparatus 113.

The color image input apparatus 111 is composed of a scanner including a device, such as a CCD, for converting optical information into an electric signal. In the color image input apparatus 111, the CCD reads an optical image reflected from an original document as RGB analog signals, and outputs RGB analog signals.

The analog signals scanned by the color image input apparatus 111 are transmitted to an A/D conversion section 121, a shading correction section 122, a document matching process section 123, an input tone correction section 124, a segmentation process section 125, a color correction section 126, a black generation and under color removal section 127, a spatial filter process section 128, an output tone correction section 129, and a tone reproduction process section 130 in this order in the color image processing apparatus 112. Ultimately, the analog signals are outputted to the color image output apparatus 113 as CMYK digital color signals.

The A/D conversion section 121 converts the RGB analog signals into RGB digital signals. The shading correction section 122 carries out a process for removing various distortions, which are caused by an illumination system, an image focusing system, and an image sensing system of the color image input apparatus 111, from the RGB digital signals supplied by the A/D conversion section 121. Moreover, the shading correction section 122 carries out a process for achieving a color balance of the RGB digital signals and for converting the RGB digital signals into a signal, such as a density (pixel value) signal, which can be dealt with easily by the color image processing apparatus.

The document matching process section 123 corresponds to the document matching process section 2 of the image processing apparatus 101. That is, the document matching process section 123 performs feature point calculating process and features calculating process with respect to a standard image and reference images (not the standard image). The standard image and the reference images are selected from a plurality of document images which have a common format. Further, the document matching process section 123 obtains a positional relationship between a standard image and respective of reference images with the use of feature points of the standard image and feature points of respective of the reference images. The document matching process section 123 performs a logical AND operation of binary image data of the standard image and binary image data of the reference image so as to extract the common format. Further, the document matching process section 123 outputs the inputted RGB signals, without any modification, to the input tone correction section by which the section 123 is followed. Alternatively, the document matching process section 123 outputs synthesized image data to the subsequent input tone correction section, in a case where the synthesizing of image data has been carried out.

The input tone correction section 124 carries out image quality adjusting process, such as a removal of background density and contrast, with respect to the RGB signals whose various distortions have been removed by the shading correction section 122.

The segmentation process section 125 segments each pixel into a text region, a halftone dot region, or a photograph region, according to the RGB signals of an input image. In accordance with a result of the segmentation, the segmentation process section 125 outputs a segmentation class signal, indicating which region a pixel belongs to, to the black generation and under color removal section 127, the spatial filter process section 128, and the tone reproduction process section 130. The segmentation process section 125 also supplies output signals of the input tone correction section 124 to the subsequent color correction section 126.

The color correction section 126 carries out a process in which color impurity is removed in accordance with spectral characteristics of CMY color materials including an unnecessarily absorption component. This allows a faithful color reproduction to be realized.

The black generation and under color removal section 127 carries out a process in which (i) a black (K) signal is generated based on three CMY color signals which have been subjected to a color correction and (ii) new CMY signals are generated by removing, from the original CMY signals, the K signal obtained by the black signal generated. This causes the three CMY signals to be converted into four CMYK signals.

The spatial filter process section 128 causes a digital filter to carry out a spatial filter process in accordance with a segmentation class signal with respect to the image data in the form of the CMYK signals which are supplied from the black generation and under color removal section 127. The spatial filter process section 128 corrects a spatial frequency characteristic, so as to allow an output image to have reduced blur or graininess deterioration. The tone reproduction process section 130, as with the spatial filter process section 128, carries out a predetermined process (later described) with respect to the image data in the form of the CMYK signals in accordance with the segmentation class signal.

For example, as to a region segmented into a text region by the segmentation process section 125, the spatial filter process section 128 uses and causes a filter which strongly emphasizes high frequency components to carry out the spatial filter process. This allows an improvement in reproducibility of texts. Concurrently, the tone reproduction process section 130 carries out either binary process or multi-level dithering processing, with the use of a high-resolution screen suitable for reproducing the high frequency components.

With respect to a region segmented into a halftone dot region by the segmentation process section 125, the spatial filter process section 128 carries out a low pass filter process for removing input halftone dot components. The output tone correction section 129 carries out an output tone correction process in which a signal such as the density signal is converted into a halftone dot area rate that is characteristic values of the color image output apparatus 113. Subsequently, the tone reproduction process section 130 carries out a tone reproduction process in which an image is ultimately segmented into pixels and each tone of the pixels can be reproduced. With respect to a region segmented into a photograph region by the segmentation process section 125, the binary process or the multi-level dithering process is carried out with the use of a screen suitable for tone reproduction.

The image data which has been subjected to the processes mentioned above is temporarily stored in a storage device (not shown). The image data thus stored is read from the storage device at a predetermined timing, and is supplied to the color image output apparatus 113.

The color image output apparatus 113 outputs the image data onto a recording medium such as paper. An example of the color image output apparatus 113 is a color image output apparatus which employs an electrophotographic method or an ink-jet method. However, the image output apparatus 113 is not specifically limited to this. Note that the processes mentioned above are controlled by a CPU (Central Processing Unit) (not shown).

Figure 16:
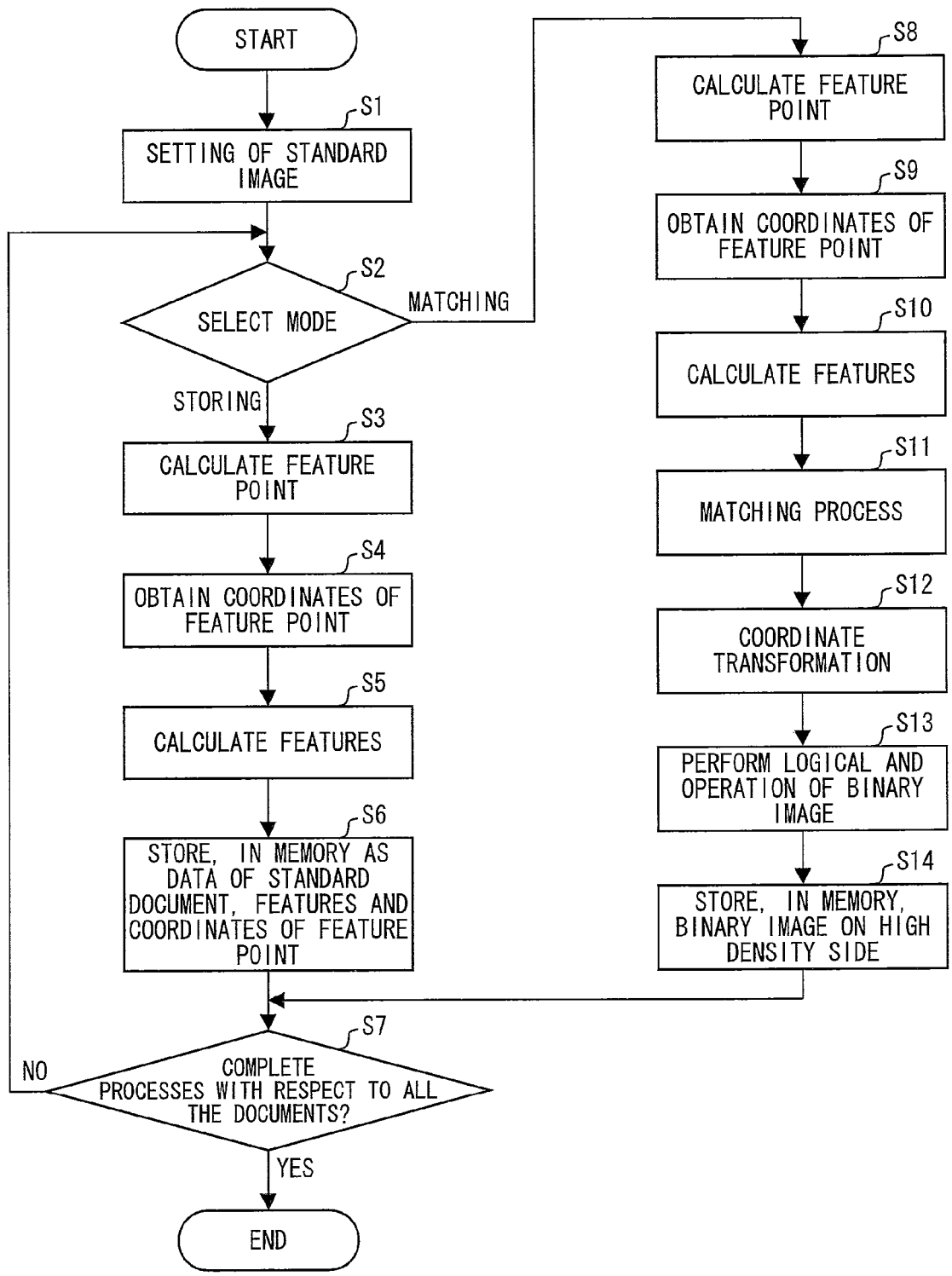
FIG. 16

The following description deals with how the image processing apparatus 101 of the present embodiment with the above arrangement operates, with reference to a flow chart shown in FIG. 16.

First, the image processing apparatus 101 carries out a process in which one of a plurality of inputted document images is set as a standard image (standard document) (S1).

In this case, for example, the color image input apparatus 111 of the digital color copying machine 102 shown in FIG. 2 generates the plurality of document images. That is, a user places a plurality of documents (e.g. five or six documents), having a common format (see FIGS. 3(*a*) through 3(*c*)), onto the color image input apparatus 111. The color image input apparatus 111 scans the documents, converts the documents into image data, and supplies the image data to the image processing apparatus 101.

For example, the control section 1 controls the image processing apparatus 101 to determine which document image should be the standard document. Specifically, the control section 1 causes the image processing apparatus 101 to set, as the standard image (standard document), a document image (image data) which is supplied first among a plurality of inputted documents images. In this case, the user places the plurality of documents onto the color image input apparatus 111 so that a document whose common format part is clear is first scanned by the color image input apparatus 111.

It is reasonable that a document which is first supplied is set as the standard image (standard document). However, a rule of selecting the standard image (standard document) is not limited to a specific one. Instead, for example, the user can select and determine what number inputted document image should be the standard image. Alternatively, the user can select the standard image (standard document) via an operation panel 114 (see FIG. 2).

Next, the control section 1 selects a storing mode or a matching mode as a processing mode (S2). In this regard, the control section 1 selects the storing mode in a case where the standard image is processed, whereas the control section 1 selects the matching mode in a case where the reference image is processed. The mode selection can be made by means of the operation panel 114 of digital color copying machine 102. Alternatively, the mode selection can be made by means of a terminal device of an image processing system including the image processing apparatus 101 and the terminal device (computer) connected to the image processing apparatus 101.

In a case where the storing mode is selected in the step S2, the feature point calculating section 11 calculates feature points of the inputted image data (i.e. standard image) (S3), and obtains coordinates of such feature points (S4).

Next, the features calculating section 12 calculates features of the feature points calculated by the feature point calculating section 11 (S5).

Next, the storing process section 16 stores, in the memory 3, the features (feature vectors, hash values), an index and coordinates for each of the feature points of the standard image (S6). This allows a table regarding the standard image to be obtained (see FIG. 4). When S6 is completed, processing in the image processing apparatus 101 returns to S2.

Next, the control section 1 selects the matching mode as the processing mode in the step S2. In a case where the matching mode is selected in the step S2, the feature point calculating section 11 calculates feature points of the inputted image data (i.e. reference images) (S8), and obtains coordinates of such feature points (S9).

Next, the features calculating section 12 calculates features of the feature points calculated by the feature point calculating section 11 (S10).

Next, the matching process section 13 carries out matching processing between the standard image and respective of the reference images so as to obtain feature points at which features (feature vectors, hash values) of the standard image agree with those of respective of the reference images. In response to this processing, the storing process section 16 stores the features (feature vectors, hash values), indices, and coordinates of the feature points of respective of the reference images in the table for the standard image (see FIG. 4) (S11). This allows a preparation of a table showing relationship between the feature points of the standard image and the feature points of respective of the reference images at which the features (feature vectors, hash values) of the standard image agree with those of respective of the reference images (see FIG. 5).

Next, the coordinate transformation section 14 transforms a coordinate system of the reference image into a coordinate system of the standard image, with the use of coordinates of first feature points of the standard image and coordinates of second feature points of the reference image. Note that the matching process section 13 determines that the features (feature vectors, hash values) at the first feature points agree with those at the second feature points, respectively (S12).

Next, the logical AND operation section 15 performs a logical AND operation of binary image data of the standard image and respective of binary image data of the reference images which have been subjected to coordinate transformation (S13).

Next, the storing process section 16 stores, in the memory 3 as binary image data of a common format (corresponding to FIG. 3(*d*)), a binary image (binary image on a high density side) found by the logical AND operation section 15 (S14). In the present embodiment, RGB data is used as image data. Therefore, image data on a high density side is data of luminance Y=0, e.g., data indicative of a ruled line or a text string).

Subsequently, the image processing apparatus 101 repeatedly carries out the processes in the steps S8 through S14 with respect to the other reference images. When the processes with respect to all the documents are completed (S7), the image processing apparatus 101 deactivates. Note in the processes of the steps S8 through S14 for the reference images that (i) image data of a first common format which was obtained with the use of a first reference image is used as a second standard image, (ii) image data of a second common format is obtained based on the second standard image and a second reference image, (iii) the image data of the second common format is used as a third standard image, and then (iv) image data of a third common format is obtained based on the third standard image and a third reference image. In this way, the common format is sequentially updated. This makes it possible to precisely obtain image data of a common format.

Figure 17:
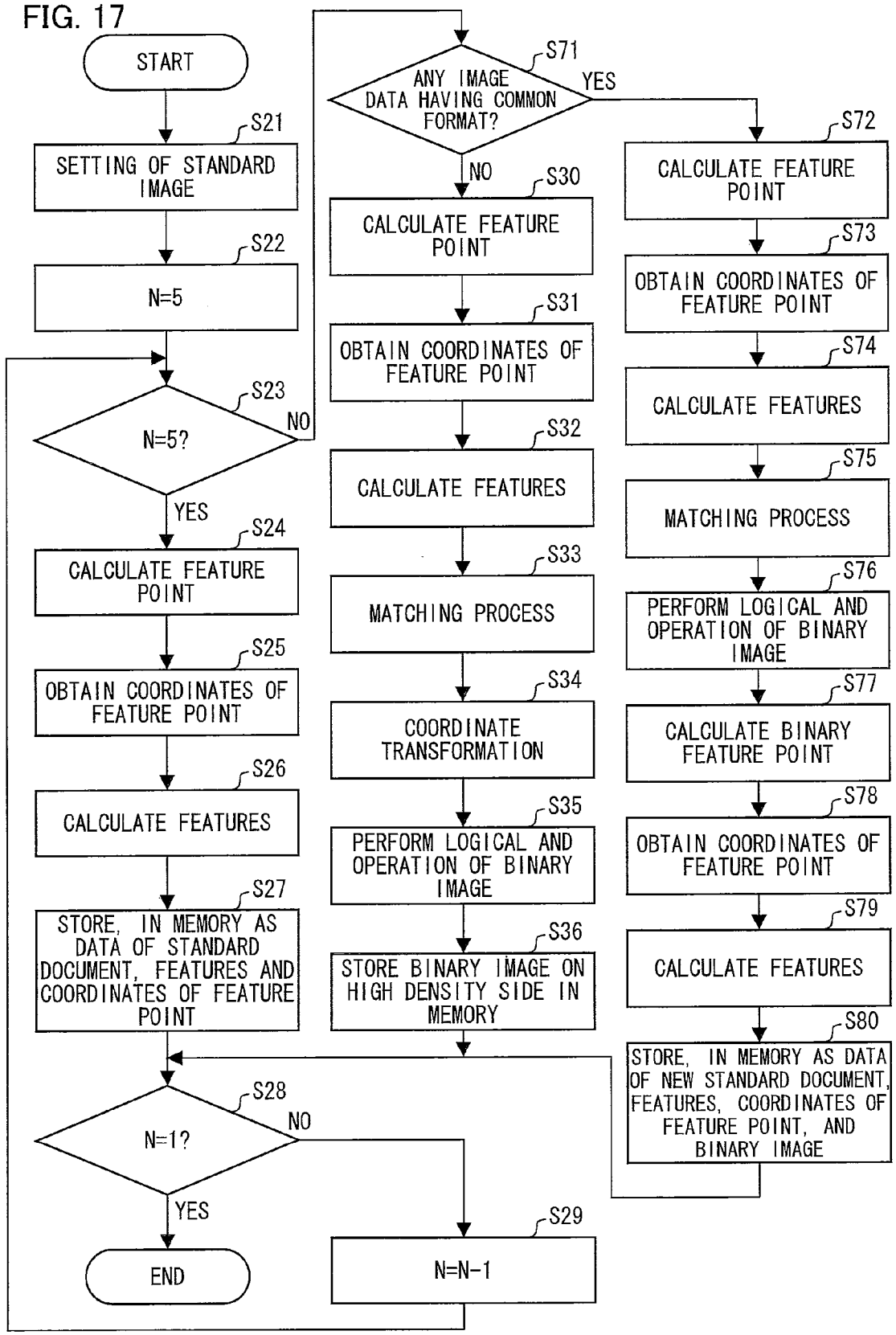
FIG. 17

FIG. 17 is a flow chart showing how the image processing apparatus 101 operates in a case where a document image which is first supplied among a plurality of inputted document images is set as a standard image. In the flow chart of FIG. 17, steps S24 through S27 correspond to the steps S3 through S6 of FIG. 16, respectively, and steps S30 through S36 correspond to the steps S8 through S14 of FIG. 16, respectively. In view of this, these operations are not explained.

In FIG. 17, the image processing apparatus 101 carries out a process in which a document image, which was first supplied from among a plurality of inputted document images, is set as a standard image (standard document) (S21).

After the process in the step S2, the number of the inputted document images is set to five (N=5) for example (S22). The setting of the number is carried out with respect to, for example, a counter in the control section 1 of the image processing apparatus 101. Alternatively, for example in the digital color copying machine 102 shown in FIG. 2, the number of the inputted document images is set by a user who enters the number of the documents placed onto an ADF by means of the operation panel 114.

An initial set value of the counter is 5 (S23), and therefore when a first document image is inputted, the control section 1 regards the first document image as a standard image, and carries out the steps S24 through S27, i.e., the process of the storing mode (see FIG. 16). Subsequently, the set value of the counter is reduced by −1, i.e., N=4 is set with respect to the counter) (S29), and processing of the control section 1 returns to S23.

Next, the set value of the counter is set as 4 (S23), and therefore when a second document image is inputted, the control section 1 regards the second document image as the reference image and performs steps of S30 through S36, i.e., the process of the matching mode (see FIG. 16). Subsequently, the image processing apparatus 101 repeatedly carries out the steps S30 through S36 up to the last document, and deactivates.

Steps S71 through S80 are carried out with respect to reference images following a second reference image which obtains image data of a next common format while image data of a common format previously obtained is used as a new standard image. That is, in the processes carried out to the reference images by which the second reference image is followed, the steps S72 through S80 are carried out, provided that image data of a common format (binary image data on a high density side) is obtained. In this case, steps S72 through S75 and S76 correspond to the steps S30 through S33 and S35, respectively, and steps S77 through S79 correspond to the steps S24 through S27, respectively. Further, in the binary feature point calculating process (S77) carried out to image data of a common format (binary image data), (i) the processes in the signal conversion section 21 through the binarization process section 24 in the feature point calculating section 11 (see FIG. 6) are not carried out and (ii) only the process in the centroid calculating section 25 is carried out.

As described above, according to the image processing apparatus 101 of the present embodiment, (i) one of a plurality of inputted document images is regarded as a standard image and the other document images are regarded as reference images, (ii) feature points at which features of the standard image agree with those of respective of the reference images are extracted with the use of a document matching technique, (iii) an expression of coordinate transformation between the standard image and respective of the reference images is found with the use of coordinate values of the feature points thus extracted, (iv) a positioning of the standard image and the reference image is carried out with the use of the expression for coordinate transformation, and (v) a common format contained in the standard image and respective of the reference images is extracted.

Therefore, even in a case where there is no image (document) which has only a common format, an image which has only a common format can be prepared from a plurality of document images (at least two document images) which contain the common format.

A document which can be applied to the image processing apparatus 101 of the present embodiment is a document which has a fixed form (common format) and has a written text different from that of another document. Examples of such a document include every kind of application form, every kind of written contract, and every kind of questionnaire. Further, the documents shown in FIG. 3 have a form (common format) including a ruled line. However, a document which does not include a ruled line but includes only text (e.g. written contract) can be applied to the image processing apparatus 101 of the present embodiment.

[Embodiment 2]

Another embodiment of the present invention is described below with reference to the attached drawings.

Figure 18:
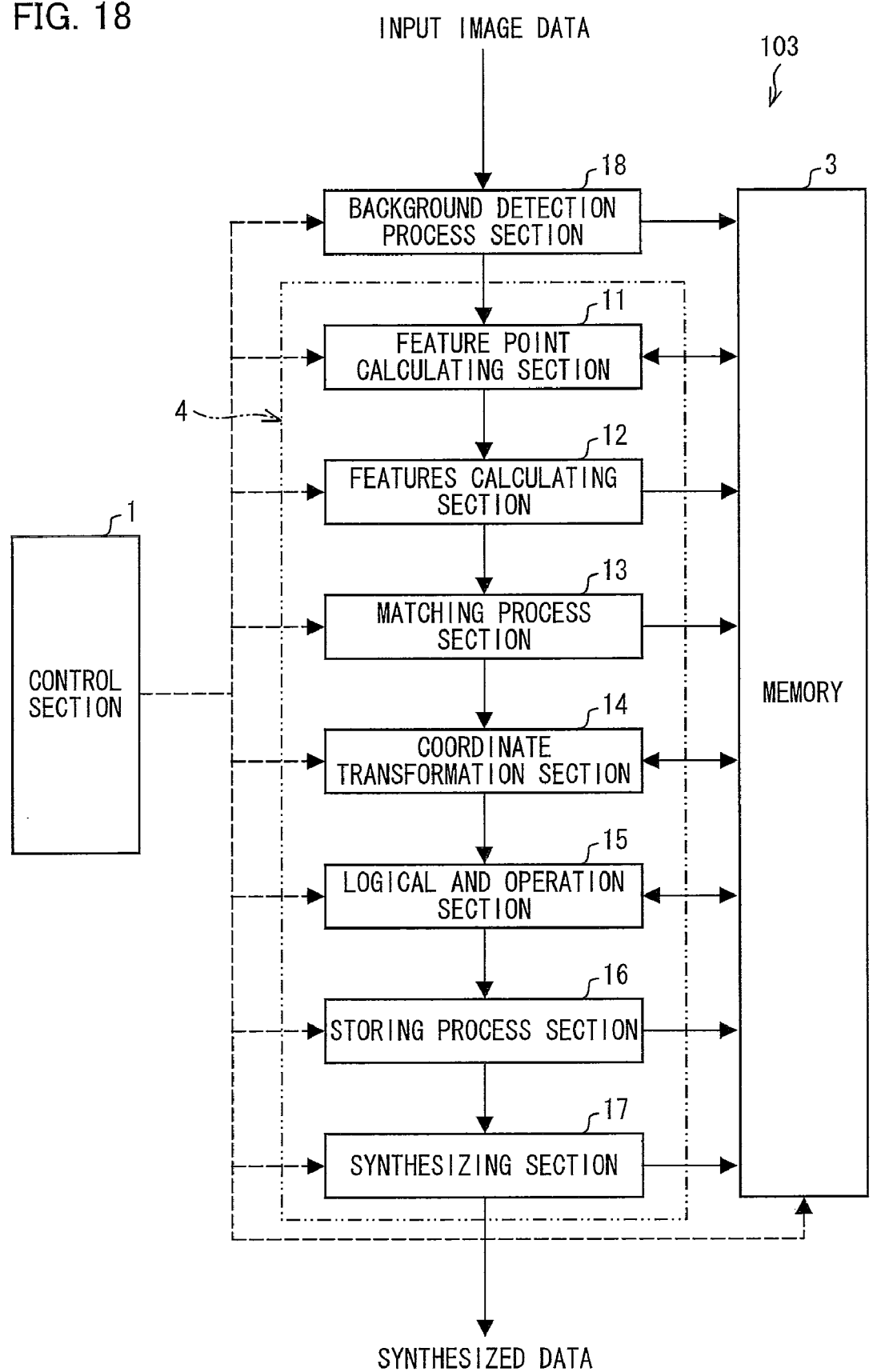
FIG. 18

FIG. 18 is a block diagram showing an arrangement of an image processing apparatus 103 of the present embodiment. The image processing apparatus 103 includes a document matching process section 4 instead of the document matching process section 2 of the image processing apparatus 101 shown in FIG. 1.

The document matching process section 4 includes a synthesizing section 17, in addition to the feature point calculating section 11, the features calculating section 12, the matching process section 13, the coordinate transformation section 14, the logical AND operation section 15 and the storing process section 16. Further, the image processing apparatus 103 includes a background detection process section 18 which is followed by the document matching process section 4.

The background detection process section 18 extracts background image data from inputted image data, and stores the background image data in the memory 3.

The synthesizing section 17 synthesizes (i) image data (corresponding to common format) (see FIG. 3(d)) stored in the memory 3 and (ii) the background image data extracted as other image data by the background detection process section 18, and outputs synthesized image data. In this case, instead of binary image data, as it is, on a high density side which binary image data was obtained by the logical AND operation section 15, image data of a standard image which corresponds to this image data is used as the image data corresponding to a common format.

In the synthesized image data, the image data of the standard image is used as a common format part, and image data extracted from the standard image, for example, is used as a background part. This makes it possible to faithfully reproduce color of an original document in a case where such parts contain a chromatic color.

In a case where the image processing apparatus 103 is applied to the digital color copying machine 102 shown in FIG. 2, an arrangement can be employed in which the document matching process section 123 and the input tone correction section 124 are counterchanged with each other. Specifically, the input tone correction section 124 is provided so as to follow the shading correction section 122, and the document matching process section 123 is provided so as to follow the input tone correction section 124. This causes the input tone correction section 124 to carry out a background removal process, that is, a process corresponding to the process carried out by the background detection process section 18.

Further, it is possible to carry out the background extraction process which is carried out by the background detection process section 18, with the use of a conventionally known technique. The following technique is an example of such a technique.

(1) An average of pixel values in a block (e.g. 7×7 pixels) constituted by a plurality of pixels including a target pixel is found for each plane (for each color component) of RGB in inputted image data. The average thus found is used as a pixel value of the target pixel.

(2) Next, a histogram of the averages for color components (a three-dimensional histogram of Rave, Gave and Bave which three-dimensional histogram has, for example, 32 density divisions) is prepared for each target pixel. Each of Rave, Gave and Bave which shows a maximum frequency is used as a background density.

Alternately, a histogram is prepared for each color component, and it is judged that there is a chromatic color background when the following conditions are fulfilled.

(1) Frequency values in R-plane, G-plane and B-plane are not less than a threshold and are almost equal to each other. Note that it is judged that there is a background when a percentage of a frequency value to the number of all pixels is 50%. Further, for example, in a case where frequency values fall within 95% of a maximum frequency value, it is judged that the frequency values are almost equal to each other.

(2) In a case where a histogram has 32 density divisions, the number of density divisions in which a frequency is not less than a threshold is not more than 2. When this condition is fulfilled, each of Rmax, Gmax and Bmax which is a density division value which shows a maximum frequency value is used as a background density. This utilizes a characteristic in which (i) a histogram of a chromatic color background has a narrow and sharp frequency distribution and (ii) maximum frequency values are almost equal to each other.

Figure 19:
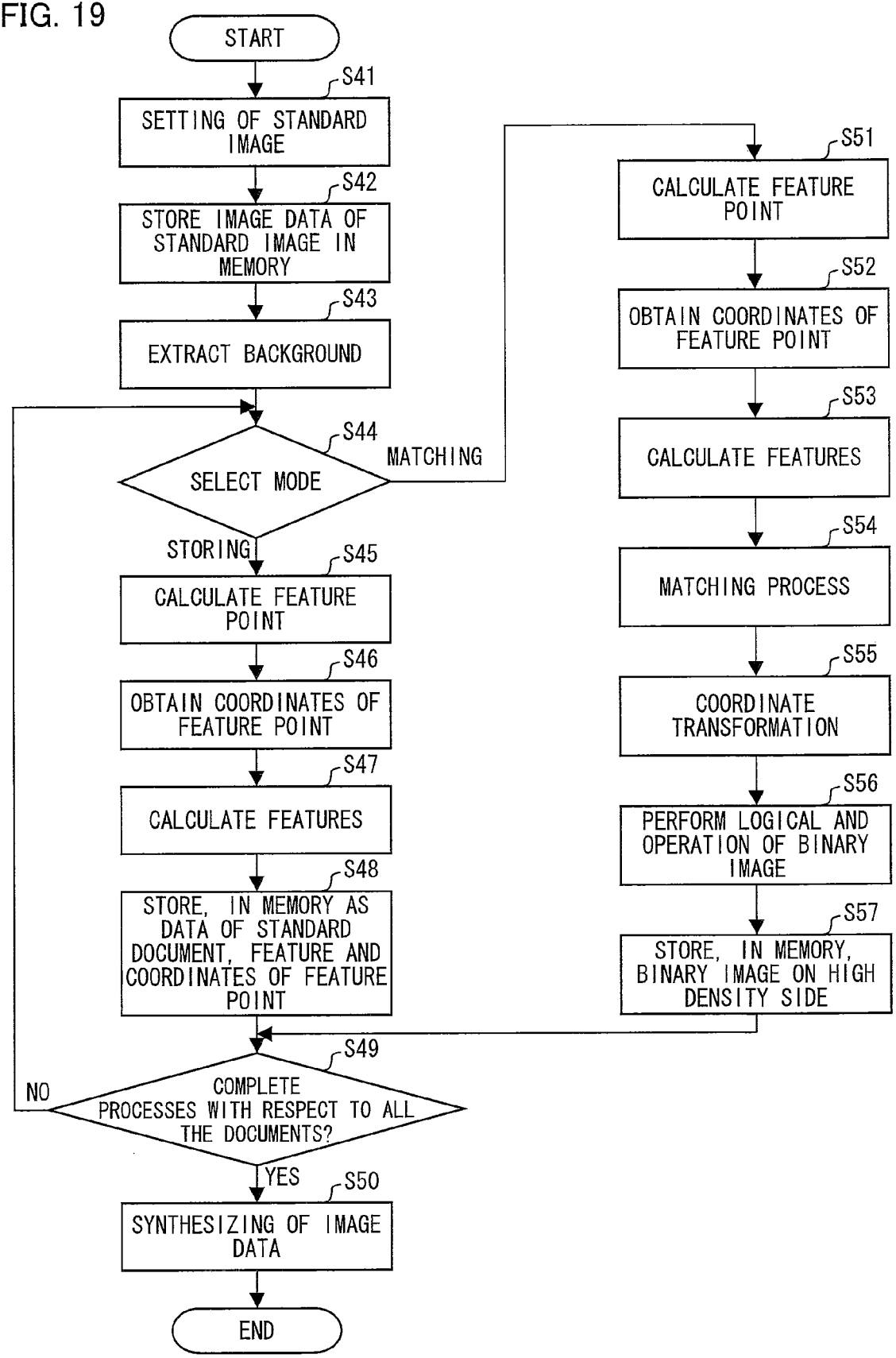
FIG. 19

The following description deals with how the image processing apparatus 103 of the present embodiment with the above arrangement operates, with reference to a flow chart of FIG. 19. In FIG. 19, the steps S41 and S44 through S49 correspond to the steps S1 and S2 through S7 of FIG. 16, respectively. Further, the steps S51 through S57 correspond to the steps S8 through S14 of FIG. 16, respectively. Therefore, these steps are not explained repeatedly.

As shown in FIG. 19, the image processing apparatus 103 carries out a process in which one of a plurality of inputted document images is set as a standard image (standard document) (S41). Next, the standard image is stored in the memory 3 (S42).

Next, the background detection process section 18 of the image processing apparatus 103 extracts background image data, for example, from the standard image, and stores the background image data in the memory 3 (S43).

Next, in the image processing apparatus 103, a storing mode is selected (S44), feature points of the standard image are calculated (S45), coordinates of each of the feature points of the standard image are obtained (S46), features (feature vectors, hash values) of each of the feature points of the standard image are calculated (S47), and the features, indices and the coordinates of each of the feature points of the standard image are stored in the memory 3 (S48).

Next, in the image processing apparatus 103, a matching mode is selected (S44), feature points of a reference image are calculated (S51), coordinates of the feature points of the reference image are obtained (S52), features (feature vectors, hash value) of the feature points of the reference image are calculated (S53), matching processing between the standard image and the reference image is carried out (S54), a coordinate system of the reference image is transformed into a coordinate system of the standard image (S55), a logical AND operation of binary image data of the standard image and binary image data of respective of the reference images whose coordinates have been transformed is performed (S56), and binary images (binary images on a high density side) thus found by the logical AND operation are stored in the memory 3 (S57).

Subsequently, as has been described earlier, the synthesizing section 17 of the image processing apparatus 103 outputs synthesized image data of a common format (S50).

In a case where the digital color copying machine 102 shown in FIG. 2 includes the image processing apparatus 103 of the present embodiment, the digital color copying machine 102 can be used in the following way.

(1) A user places, onto an ADF (not shown), a plurality of documents which contain a common format and a written text.

(2) The user selects "a mode for preparing a copy from which the written text is removed" via the operation panel 114, and issues an instruction to execute the mode.

(3) In the digital color copying machine 102, the document matching process section 123 (corresponding to the document matching process section 2 of FIG. 18) synthesizes image data, having only a common format, which is obtained by removing the written text from a standard image (corresponding to FIG. 3(a)), for example.

(4) The image data thus synthesized is subjected to the processes carried out by the document matching process section 123 and the subsequent sections. The image data thus processed is outputted to a medium such as paper by the color image output apparatus 113. This makes it possible to prepare a copy of a document which has only the common format and has no written text.

Note that the image processing apparatus 101 of the Embodiment 1 and the image processing apparatus 103 of the Embodiment 2 can also process electronic data such as image data obtained by converting image data, which is obtained by scanning a document with a scanner, into a predetermined file format such as JPEG and PDF.

For example, the present invention is applicable, as application software, to the image data which is prepared in the form of the above electronic data and is stored in a server. Specifically, in a case where the image data has an encoded image format such as JPEG or GIF, the image data is once subjected to decoding. Next, a color conversion process, such as converting of an YCC signal into RGB signals, is carried out if necessary. Subsequently, the processes of the image processing apparatuses 101 and 103 of the present embodiment are carried out.

Further, the image processing apparatuses 101 and 103 of the present embodiment can be applied to not only the digital color copying machine 102, but also to a digital color multifunction printer which has functions such as a copying function, a printing function, a fax sending function, and a scan to e-mail function.

Figure 20:
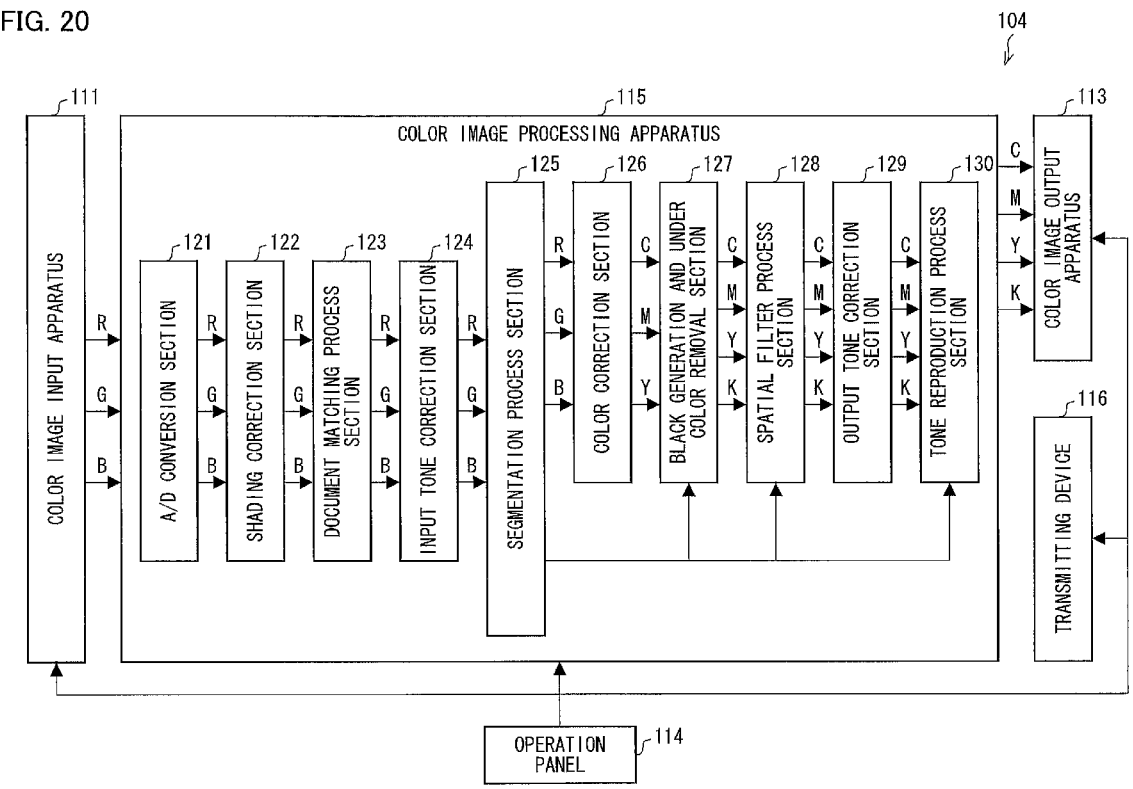
FIG. 20

FIG. 20 is a block diagram showing an arrangement of the digital color multifunction printer (image processing apparatus, image forming apparatus) 104.

The digital color copying machine 104 has an arrangement in which a communication device 116 such as a modem or a network card is added to the digital color copying machine 102 shown in FIG. 2.

In a case where the digital color multifunction printer 104 carries out facsimile transmitting, the communication device 116 carries out a transmitting procedure with a destination. While a transmittable state is secured, image data compressed in a predetermined format (image data scanned by a scanner) is read out from the memory 3. After the image data is subjected to a necessary process such as conversion of a compression format, the image data is sent to the destination via a communication line.

Further, in a case where the digital color copying machine 104 carries out facsimile receiving, the digital color copying machine 104 receives image data which is being sent from an originating communication device while a communication procedure is being carried out. The image data received is supplied to a color image processing apparatus 115. In the color image processing apparatus 115, a compressing/decompressing section (not shown) decompresses the image data received. The image data decompressed is subjected to a rotation process and/or a resolution conversion process if necessary, is subjected to an output tone correction (output tone correction section 129) and a tone reproduction process (tone reproduction process section 10), and is then outputted from the color image output apparatus 113.

Further, the digital color multifunction printer 104 communicates data with (i) a computer connected to network and (ii) other digital copying machines, via a network card or a LAN cable.

Further, the above description has dealt with an example in which the digital color multifunction printer 104 is employed. Instead, a monochromatic multifunction printer can be employed. Alternatively, a fax machine alone can be employed.

Figure 21:
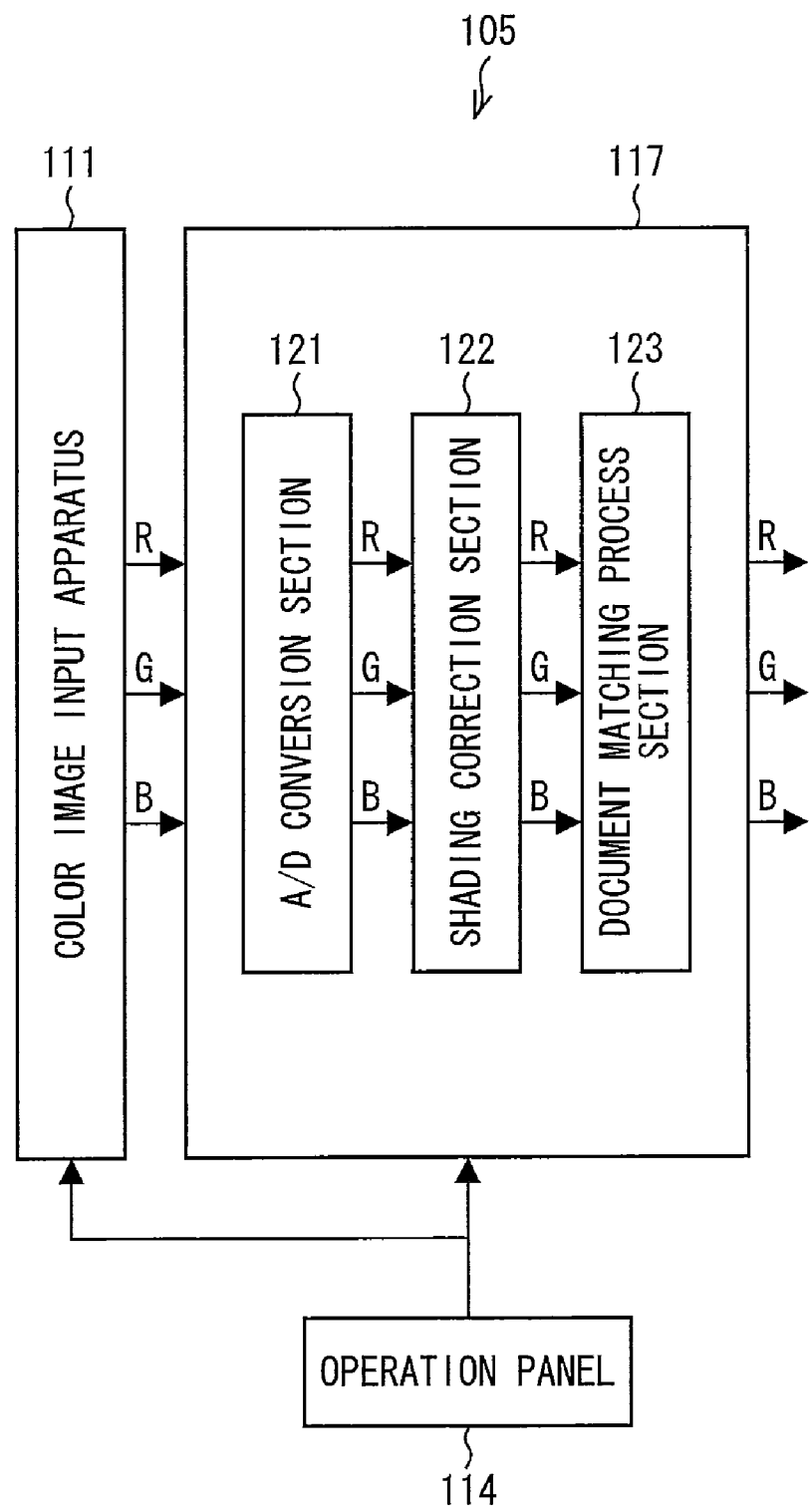
FIG. 21

Further, the image processing apparatuses 101 and 103 of the present embodiment can be also applied to an image scanning apparatus. FIG. 21 is a block diagram showing an arrangement of a color image scanning apparatus 105 to which the image processing apparatus 101 or 103 of the present embodiment is applied. The color image scanning apparatus 105 is a flatbed scanner for example. Alternatively, the color image reading apparatus 105 can be a digital camera.

The color image scanning apparatus 105 includes the color image input apparatus 111, and a color image processing apparatus 117. The color image processing apparatus 117 includes the A/D conversion section 121, the shading correction section 122 and the document matching process section 123. The document matching process section 123 corresponds to the document matching process section 2 shown in FIG. 1 or the document matching process section 4 shown in FIG. 18. The color image processing apparatus 117 which includes the document matching process section 4 further includes the background detection process section 18.

The color image input apparatus 111 (image reading means) is composed of a scanner section including, for example, a CCD (Charge Coupled Device) for scanning an optical image reflected from an original document as RGB analog signals (R: red, G: green, B: blue). The RGB analog signals scanned by the CCD are supplied to the color image processing apparatus 117.

The RGB analog signals read by the color image input apparatus 111 are transmitted to the A/D (analog/digital) conversion section 121, the shading correction section 122, and the document matching process section 123 in this order in the color image processing apparatus 117.

The A/D conversion section 121 converts the RGB analog signals into RGB digital signals. The shading correction section 122 carries out a process in which various distortions, which are caused by an illumination system, an image focusing system, and/or an image sensing system of the color image input apparatus 111, are removed from the RGB digital signals supplied from the A/D conversion section 121. Moreover, the shading correction section 122 adjusts color balance of the RGB digital signals and converts each RGB reflectivity signal into a density signal.

The document matching process section 123 has the same functions as the functions, which have been described earlier, of the document matching process section 2 or the document matching process section 4. (i) Image data, having a common format, which has been prepared by the document matching process section 123 or (ii) synthesized image data (in a case where the synthesizing of image data has been carried out) are transmitted to a printer or a multifunction printer via a network so as to be outputted from the printer or the multifunction printer. Alternatively, such image data is supplied to a printer via a computer or is directly supplied to a printer.

Further, in a case where the color image scanning apparatus 105 is employed as a constituent of a system which includes at least one of a server, a computer and a printer, then the following operation is possible. For example, instead of outputting image data having a common format or synthesized image data from the color image scanning apparatus 105, the color image scanning apparatus 105 scans image data, extracts feature points and features of the image data thus scanned, and outputs such information to the server, the computer or the printer. The server, the computer or the printer extracts a common format based on the information.

A computer-readable storage medium falls within the scope of the present invention. An image processing method for carrying out the document matching and the output controlling mentioned above can be recorded into the computer-readable storage medium in which a program code (executable program, intermediate code program, or source program) of a program causing a computer to execute the program is stored. This allows provision of a portable storage medium in which a program code, for causing the image processing method for document matching, output controlling and storing processing of a document image to be executed, is stored.

As to the storage medium of the present embodiment, a memory (not shown), for example, a ROM itself can become a program medium because a microcomputer executes processes. Alternatively, the storage medium of the present embodiment can be a program medium which can be read out by inserting a storage medium into a program reading device provided as an external storage device (not shown).

In each case, an arrangement in which a microprocessor accesses and executes a stored program is possible. Alternatively, another arrangement is possible in which a program code is read out and is then downloaded in a program storage area (not shown) of a microcomputer so as to be executed. Note that a program for downloading the program code is stored in a main body of the image processing apparatus in advance.

Here, the program medium is a storage medium which can be separated from a body device, and may be a medium for fixedly carrying a program, including a tape, such as a magnetic tape or a cassette tape; a magnetic disk, such as a floppy (Registered Trademark) disk or a hard disk, or an optical disk, such as CD-ROM/MO/MD/DVD/CD-R; a card, such as an IC card (memory card) or an optical card; or a semiconductor memory, such as a mask ROM/EPROM/EEPROM/flash ROM.

Further, in the present embodiment, a system is arranged to be capable of being connected to a communication network including Internet. Therefore, the program medium can be a medium for fluidly bearing programs by downloading a program code from the communication network. In a case where a program code is downloaded from a communication network, a program for downloading the program code can be stored in a main body of the image processing apparatus in advance or can be installed from a separate storage medium. The present invention can be realized in the form of a computer signal which is embedded into a carrier wave and is embodied by electronic transmission of the program code.

The storage medium is read by a program reading device provided in a digital color image forming apparatus or in a computer system, so that the foregoing image processing method is executed.

Further, a computer system is constituted by an image input apparatus such as a flatbed scanner, a film scanner or a digital camera; a computer which carries out various processes such as the image process method in response to loading of a predetermined program; an image display device (e.g. CRT display device, liquid crystal display device) for displaying results processed by the computer; and a printer for outputting the results processed by the computer onto a paper or the like. The computer system further includes a network card or a modem, serving as communication means, for connecting to a server via a network.

As described above, an image processing apparatus of the present invention may be arranged such that the image data, having the common format, extracted by the logical AND operation section is selected as the first document image data, document image data which is different from the document image data which has been processed by the sections is selected as the second document image data, the first and second document image data are processed by the feature point extracting section, the features calculating section, the matching process section, the coordinate transformation section and the logical AND operation section, and the logical AND operation section extracts image data having a second common format.

Further, the image processing method may be arranged such that the image data, having the common format, extracted by the logical AND operation section is selected as the first document image data, document image data which is different from the document image data which has been processed in the steps (a) through (e) is selected as the second document image data, the first and second document image data are processed in the steps (a), (b), (c), (d) and (e), and image data having a second common format is extracted in the step (e).

According to the above arrangement, image data having a common format, extracted once, is set as first document image data, document image data which is different from the document image data which has been used in extracting the first document image data is set as the second document image data, and the first document image data and the second document image data are used in extracting image data of a common format again. This makes it possible to more accurately extract image data having a common format.

The image processing apparatus may be arranged such that the matching process section extracts a plurality of first feature points and a plurality of second feature points whose features agree with each other, respectively, and the coordinate transformation section transforms the coordinate system of the second document image data into the coordinate system of the first document image data in accordance with coordinates of the plurality of first and second feature points which have been extracted by the matching process section.

According to the above arrangement, the coordinate transformation section carries out coordinate transformation by using a plurality of first feature points and a plurality of second feature points whose features agree with each other. Therefore, in a case where the plurality of feature points includes a feature point which was mistakenly extracted, by the matching process section, as a feature point at which features (feature vectors, hash values) of the standard image agree with those of the reference image was mistakenly judged, the coordinate transformation section can perform coordinate transformation while an influence due to the pair of features is reduced. This makes it possible to more accurately extract image data having a common format.

The image processing apparatus may be arranged so as to include storage means for storing the first document image data and the image data having the common format extracted by the logical AND operation section, and a synthesizing section for reading out and outputting image data, which corresponds to the image data having the common format, from the first document image data.

According to the above arrangement, in response to a request for image data having a common format, the synthesizing section reads out and outputs image data, which corresponds to the image data having the common format, from the first document image data, instead of the image data, having the common format, stored in a storage medium.

This makes it possible to faithfully reproduce color of an original document in a case where a chromatic color is used in the common format part of the first document image data.

The image processing apparatus may be arranged so as to include a background detection process section for extracting background image data from the first document image data, and for storing the image data in the storage means, the synthesizing section reading out the image data, which corresponds to the image data having the common format, from the first document image data, synthesizing the background image data and other area of the image data read out than an area where the common format is located, and outputting the image data synthesized.

According to the above arrangement, in response to a request for image data having a common format, the synthesizing section reads out image data, which corresponds to the image data of the common format, from the first document image data, synthesizes the background image data and other area of the image data read out than an area where the common format is located, instead of the image data having the common format stored in a storage medium.

This makes it possible to more faithfully reproduce color of an original document including a background in a case where a chromatic color is used in the common format part and the background part of the first document image data.

An image forming apparatus of the present invention includes any one of the image processing apparatuses and image output means for printing image data and outputting the image data.

According to the above arrangement, in a case where a document which has a common format and has no written text is necessary, it is possible to accurately reproduce a document which has only a common format part from a plurality of documents which have written texts.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

The invention claimed is:

1. An image processing apparatus comprising:
a feature point extracting section for extracting, from first and second document image data among plural inputted document image data, first feature points of the first document image data and second feature points of the second document image data;
a features calculating section for calculating first features of the first feature points and second features of the second feature points;
a matching process section for comparing the first features with the second features, and for extracting a plurality of first feature points and a plurality of second feature points whose features agree with each other;
a coordinate transformation section for transforming a coordinate system of the second document image data into a coordinate system of the first document image data in accordance with coordinates of the first and second feature points extracted by the matching process section; and a logical AND operation section for performing a logical AND operation of the first document image data and the second document image data which has been processed by the coordinate transformation section so as to extract an image, having a common format, contained in both the first and the second document image data.

2. The image processing apparatus according to claim 1, wherein:

the image, having the common format, extracted by the logical AND operation section is selected as the first document image data;

document image data which is different from the document image data which has been processed by the sections is selected as the second document image data;

the first and second document image data are processed by the feature point extracting section, the features calculating section, the matching process section, the coordinate transformation section, and the logical AND operation section; and the logical AND operation section extracts image data having a second common format.

3. The image processing apparatus according to claim 1, wherein:

the matching process section extracts a plurality of first feature points and a plurality of second feature points whose features agree with each other, respectively; and the coordinate transformation section transforms the coordinate system of the second document image data into the coordinate system of the first document image data in accordance with coordinates of the plurality of first and second feature points which have been extracted by the matching process section.

4. The image processing apparatus according to claim 1, further comprising:

a storage section for storing the first document image data and the image having the common format extracted by the logical AND operation section; and a synthesizing section for reading out and outputting image data, which corresponds to the image having the common format, from the first document image data.

5. The image processing apparatus according to claim 4, further comprising:

a background detection process section for extracting background image data from the first document image data, and for storing the image data in the storage means;

the synthesizing section reading out the image data, which corresponds to the image having the common format, from the first document image data, synthesizing the background image data and other area of the image data read out than an area where the common format is located, and outputting the image data synthesized.

6. An image forming apparatus comprising:
an image processing apparatus recited in claim 1; and
an image output section for printing image data.

7. A computer-readable storage medium storing a program for causing a computer to function as at least the sections of the image processing apparatus recited in claim 1.

8. An image processing method comprising:

extracting, from first and second document image data among plural inputted document image data, first feature points of the first document image data and second feature points of the second document image data;

calculating first features of the first feature points and second features of the second feature points;

comparing the first features with the second features, and extracting a plurality of first feature points and a plurality of second feature points whose features agree with each other;

transforming a coordinate system of the second document image data into a coordinate system of the first document image data in accordance with coordinates of the first and second feature points; and performing a logical AND operation of the first document image data and the second document image data so as to extract an image, having a common format, contained in both the first and the second document image data.

9. The image processing method according to claim 8, wherein:

the image, having the common format, is selected as the first document image data;

document image data which is different from the document image data which has been processed in the extracting, calculating, comparing, transforming, and performing is selected as the second document image data;

the first and second document image data are processed in the extracting, calculating, comparing, transforming, and performing; and image data having a second common format is extracted in the performing the logical AND operation.

* * * * *